United States Patent
Gunnarsson et al.

(10) Patent No.: US 9,544,834 B2
(45) Date of Patent: Jan. 10, 2017

(54) FIRST RNC, A SECOND RNC, A BASE STATION, AN OAM NODE AND METHODS THEREIN FOR HANDLING A REUSE OF A SCRAMBLING CODE IN A CELLULAR NETWORK

(75) Inventors: Fredrik Gunnarsson, Linköping (SE); Klas Johansson, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 232 days.

(21) Appl. No.: 14/366,480

(22) PCT Filed: Dec. 21, 2011

(86) PCT No.: PCT/SE2011/051561
§ 371 (c)(1),
(2), (4) Date: Jun. 18, 2014

(87) PCT Pub. No.: WO2013/095228
PCT Pub. Date: Jun. 27, 2013

(65) Prior Publication Data
US 2015/0156707 A1    Jun. 4, 2015

(51) Int. Cl.
*H04B 7/216* (2006.01)
*H04W 48/16* (2009.01)
(Continued)

(52) U.S. Cl.
CPC ........... *H04W 48/16* (2013.01); *H04B 1/7083* (2013.01); *H04J 11/0069* (2013.01);
(Continued)

(58) Field of Classification Search
CPC .. H04W 48/16; H04W 36/0061; H04W 72/00; H04B 1/7083; H04J 11/0069
See application file for complete search history.

(56) References Cited

U.S. PATENT DOCUMENTS

2008/0101301 A1* 5/2008 Thomas ............... H04W 36/04
                                                      370/335
2010/0315967 A1   12/2010 Patel et al.
(Continued)

FOREIGN PATENT DOCUMENTS

EP    2 079 263    7/2009
GB    2 446 193    8/2008
(Continued)

OTHER PUBLICATIONS

Office Action in EP application No. 11877774.7 mailed May 13, 2015, pp. 6.
(Continued)

*Primary Examiner* — Abdelnabi O Musa
(74) *Attorney, Agent, or Firm* — Patent Portfolio Builders, PLLC

(57) ABSTRACT

A method in a first radio network controller, RNC, (105, 405) for handling a reuse of a scrambling code in a cellular network (100) is provided. The first RNC (105, 405) defines a set of scrambling codes. Each scrambling code in the defined set is locally reused by at least two cells in the cellular network (100). The first RNC (105, 405) receives a measurement report from a user equipment (180). The measurement report is related to a scrambling code that is comprised in the defined set of scrambling codes. The first RNC (105, 405) determines that the reported scrambling code is comprised in the defined set of scrambling codes. The first RNC (105, 405) initiates, based on the determination, a process for identifying, among the at least two cells in which the reported scrambling code is locally reused, an originating cell from which the reported scrambling code originates.

18 Claims, 14 Drawing Sheets

(51) Int. Cl.
*H04B 1/7083* (2011.01)
*H04J 11/00* (2006.01)
*H04W 72/00* (2009.01)
*H04W 36/04* (2009.01)
*H04W 36/00* (2009.01)

(52) U.S. Cl.
CPC .... *H04W 36/0061* (2013.01); *H04W 36/0077* (2013.01); *H04W 36/04* (2013.01); *H04W 72/00* (2013.01)

(56) References Cited

U.S. PATENT DOCUMENTS

| | | | | |
|---|---|---|---|---|
| 2010/0323631 | A1* | 12/2010 | Martin | H04B 17/0067 455/67.11 |
| 2012/0176918 | A1* | 7/2012 | Callender | H04L 25/03866 370/252 |
| 2012/0178451 | A1* | 7/2012 | Kubota | H04W 8/00 455/436 |

FOREIGN PATENT DOCUMENTS

| | | |
|---|---|---|
| WO | WO 2008/057658 | 5/2008 |
| WO | WO 2008/094334 | 8/2008 |
| WO | WO 2009/082307 | 7/2009 |
| WO | WO 2009/128656 | 10/2009 |
| WO | WO 2010/002692 | 1/2010 |
| WO | WO 2010/013032 | 2/2010 |
| WO | WO 2011/018641 | 2/2011 |

OTHER PUBLICATIONS

Office Action in EP application No. 11877774.7 mailed Oct. 15, 2015.
EP Search Report for Application No. / Patent No. 11877774.7-1852 / 2749101, Apr. 17, 2015.
PCT International Preliminary Report on Patentability for International application No. PCT/SE2011/051561, Jun. 24, 2014.
International Search Report for International Application No. PCT/SE2011/051561, Dec. 13, 2012.
"Scrambling Code Planning for 3GPP W-CDMA Systems" by Young-Ho Jung and Yong H. Lee; Korea Advanced Institute of Technology Department of EECS, 2001.
3GPP TS 25.423 V3.14.2; 3rd Generation Partnership Project; Technical Specification Group Radio Access Network; UTRAN Iur interface RNSAP signalling (Release 1999) (Note: Due to size, this reference has been split into two parts), 1999.
3GPP TR 25.931 V3.7.0; 3rd Generation Partnership Project; Technical Specification Group Ran; UTRAN Functions, Examples on Signalling Procedures (Release 1999), 1999.
3GPP TS 25.433 V3.14.2; 3rd Generation Partnership Project; Technical Specification Group Radio Access Network; UTRAN Iub interface NBAP signalling (Release 1999) (Note: Due to size, this reference has been split into two parts), 1999.
ETSI TS 125 331 V3.21.0; Universal Mobile Telecommunications System (UMTS); Radio Resource Control (RRC) protocol specification (3GPP TS 25.331 version 3.21.0 Release 1999) (Note: Due to size, this reference has been split into four parts), 1999.

* cited by examiner

FIRST RNC, A SECOND RNC, A BASE STATION, AN OAM NODE AND METHODS THEREIN FOR HANDLING A REUSE OF A SCRAMBLING CODE IN A CELLULAR NETWORK

PRIORITY

This nonprovisional application is a U.S. National Stage Filing under 35 U.S.C. §371 of International Patent Application Serial No. PCT/SE2011/051561, filed Dec. 21, 2011 and entitled "A First RNC, A Second RNC, A Base Station, An OAM Node and Methods Therein for Handling A Reuse of A Scrambling Code in A Cellular Network."

TECHNICAL FIELD

Embodiments herein relate to a first and a second radio network controller and a method in a first and a second radio network controller. Embodiments herein further relate to a base station and a method in a base station, and to an operations and maintenance node and a method in an operations and maintenance node. In particular, embodiments herein relate to handling a reuse of a scrambling code in a cellular network.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro NodeB, home NodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

Cellular networks evolve towards higher data rates, together with improved capacity and coverage. In 3GPP, standardization body technologies like GSM, High Speed Packet Access (HSPA) and LTE have been and are currently developed.

In the context of this disclosure, a base station as described above will be referred to as a base station or a RBS. A user equipment as described above, will in this disclosure be referred to as a user equipment or a UE. A radio network controller as described above will be referred to as a radio network controller or a RNC.

The expression DownLink (DL) will be used for the transmission path from the base station to the user equipment. The expression UpLink (UL) will be used for the transmission path in the opposite direction i.e. from the user equipment to the base station.

To support mobility of user equipments between cells in a cellular network, so called handovers are be performed. A handover may be a change of serving cell, so that a user equipment being served by one cell, becomes served by another, so called candidate cell, instead. A handover may also mean addition of a radio link to a candidate cell without removing established radio links to other cells; or replacement of one of the existing radio links by a radio link to a candidate cell. Communication that involves a multitude of cells may be referred to as macro diversity, soft handover, softer handover or coordinated multipoint, etc. The set of cells with which the user equipment have radio links is referred to as the active set. Hence, a handover includes the setup of a radio link connection between the user equipment and the candidate cell, so that the candidate cell may become the serving cell for the user equipment.

Some cellular networks feature soft handover where a user equipment may be allocated a multitude of radio links. These radio links may be with the same base station or different base stations. Furthermore, the base stations may be controlled by different nodes, such as for example different RNCs.

Neighbor cell relations may be used to facilitate handover of the user equipment between base stations. In UTRAN, the user equipment is provided with a so called neighbor cell list comprising cell identifiers, or indexes associated with cell identifiers, of plausible candidate cells to search for and perform measurements on. The user equipment is provided with the neighbor cell list by its so called serving RNC, which is also the RNC to which it reports when a candidate cell is detected.

Each cell in the cellular network broadcasts a well-defined signature sequence. In UTRAN, this sequence is a scrambling code. Sequences are enumerated and associated with the cell identifier for the cell. The scrambling codes are reused in the cellular network, and are therefore not globally unique. They may however be perceived as locally unique by careful selection, and thereby they may be used by the serving RNC to unambiguously identify candidate cells for handover when the user equipment reports them. The user equipment regularly perform measurements to detect scrambling codes which are broadcast in its vicinity.

In addition to the reused scrambling codes, the base stations broadcasts globally unique cell identifiers, so called Cell Global Identifiers (CGI)s. However, in order to keep the candidate cell measurement procedures simple, these may not be decoded and reported to the serving RNC for candidate cell discovery purposes.

Because of scrambling codes being reused they may however in some situations not be locally unique, due to for example a large amount of cells being present in an area.

This is a problem since the serving RNC cannot then unambiguously determine which cell is actually reported by the user equipment when such a locally reused scrambling code is reported.

SUMMARY

In view of the discussion above, it is an object for embodiments herein to provide an improved way of handling a reuse of a scrambling code in a cellular network.

According to a first aspect, the object is achieved by method in a first radio network controller for handling a reuse of a scrambling code in a cellular network. The first radio network controller defines a set of scrambling codes. Each scrambling code in the defined set is locally reused in at least two cells in the cellular network. The first radio network controller receives a measurement report from a user equipment. The measurement report is related to a scrambling code that is comprised in the defined set of scrambling codes. The first radio network controller determines that the reported scrambling code is comprised in the defined set of scrambling codes. The first radio network controller initiates, based on the determination, a process for identifying, among the at least two cells in which the reported scrambling code is locally reused, an originating cell from which the reported scrambling code originates.

According to a second aspect, the object is achieved by a first radio network controller for handling a reuse of a scrambling code in a cellular network. The first radio network controller comprises a defining unit. The defining unit is configured to define a set of scrambling codes. Each scrambling code in the defined set is locally reused in at least two cells in the cellular network. The first radio network controller comprises a receiving unit. The receiving unit is configured to receive a measurement report from a user equipment. The measurement report is related to a scrambling code that is comprised in the defined set of scrambling codes. The first radio network controller further comprises a determining unit. The determining unit is configured to determine that the reported scrambling code is comprised in the defined set of scrambling codes. The first radio network controller further comprises an initiating unit. The initiating unit is configured to initiate, based on the determination, a process for identifying, among the at least two cells in which the reported scrambling code is locally reused, an originating cell from which the reported scrambling code originates.

According to a third aspect, the object is achieved by a method in a base station for assisting a first radio network controller in handling a reuse of a scrambling code in a cellular. The base station serves a respective cell of at least two cells in which a scrambling code is locally reused. The base station receives a cell identification request from the first radio network controller. The cell identification request comprises an identifier of a user equipment that has reported the scrambling code. The cell identification request commands the respective base station to detect the identifier of the user equipment within the respective cell.

According to a fourth aspect, the object is achieved by a base station for assisting a first radio network controller in handling a reuse of a scrambling code in a cellular network. The base station is configured to serve a respective cell of at least two cells in which a scrambling code is locally reused. The base station comprises a receiving unit configured to receive a cell identification request from the first radio network controller. The cell identification request comprises an identifier of a user equipment that has reported the scrambling code. The cell identification request commands the respective base station to detect the identifier of the user equipment within the respective cell.

According to a fifth aspect, the object is achieved by a method in a second radio network controller for assisting a first radio network controller in handling a reuse of a scrambling code in a cellular network. The second radio network controller controls a respective base station that serves a respective cell of at least two cells in which a scrambling code is locally reused. The second radio network controller receives a cell identification request from the first radio network controller. The cell identification request comprises an identifier of a user equipment that has reported the scrambling code. The cell identification request commands the respective base station to detect the identifier of the user equipment within the respective cell. The second radio network controller forwards the cell identification request to the respective base station.

According to a sixth aspect, the object is achieved by a second radio network controller for assisting a first radio network controller in handling a reuse of a scrambling code in a cellular network. The second network controller is configured to control a respective base station that serves a respective cell of at least two cells in which a scrambling code is locally reuse. The second radio network controller comprises a receiving unit configured to receive a cell identification request from the first radio network controller. The cell identification request comprises an identifier of a user equipment that has reported the scrambling code. The cell identification request commands the respective base station to detect the identifier of the user equipment within the respective cell. The second radio network controller comprises a forwarding unit configured to forward the cell identification request to the respective base station.

According to a seventh aspect, the object is achieved by a method in an operations and maintenance node for assisting a first radio network controller in handling a reuse of a scrambling code in a cellular network. The operations and maintenance node sends a set of scrambling codes to the first radio network controller. Each scrambling code in the defined set is locally reused by at least two cells in the cellular network.

According to an eighth aspect, the object is achieved by an operations and maintenance node for assisting a first radio network controller in handling a reuse of a scrambling code in a cellular network. The operations and maintenance node comprises a sending unit. The sending unit is configured to send a set of scrambling codes to the first radio network controller. Each scrambling code in the defined set is locally reused by at least two cells in the cellular network.

Since the first radio network controller defines a set of scrambling which are locally reused in the cellular network, and determines when one of these scrambling codes is reported by the user equipment, the first radio network node is able to initiate a process for uniquely identifying the cell from which the reported scrambling code originates. This provides an improved way of handling a reuse of a scrambling code in the cellular network.

DETAILED DESCRIPTION

Figure 1:
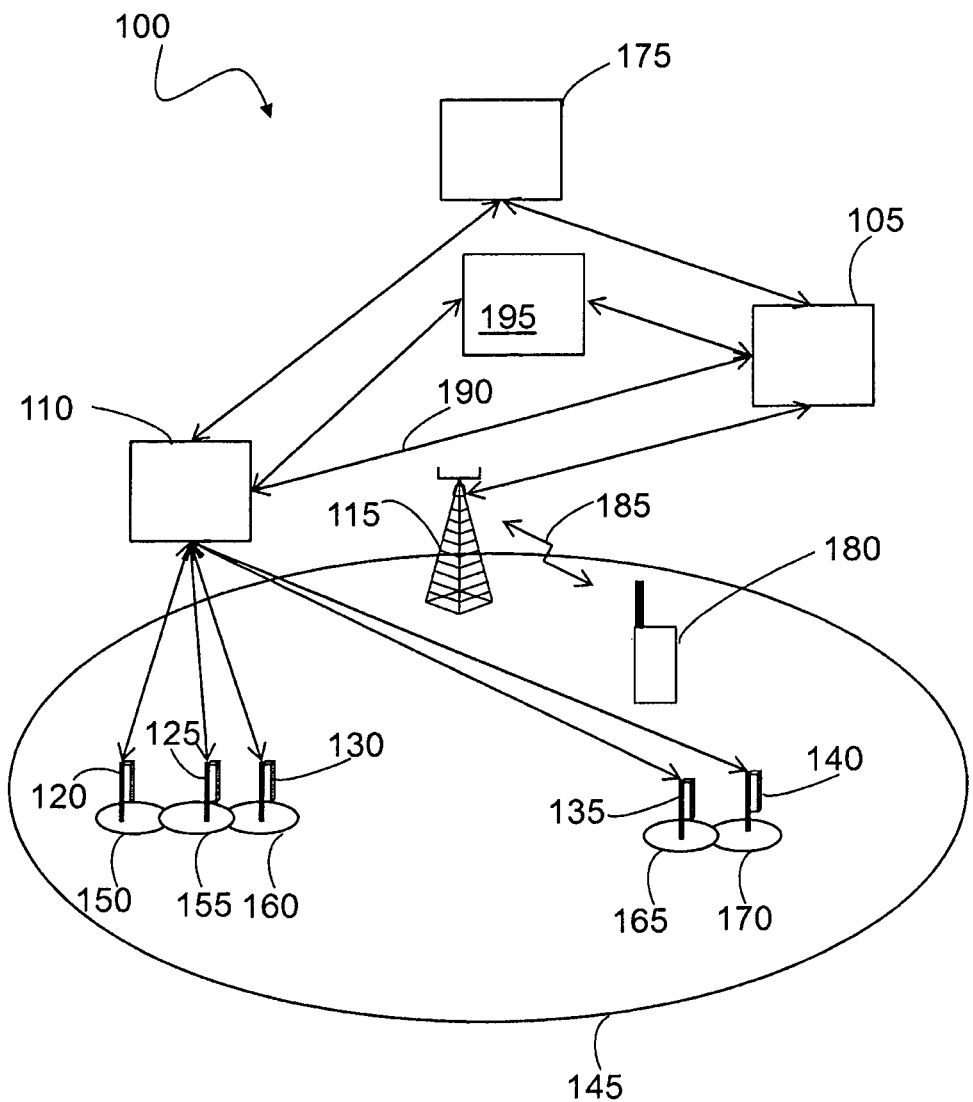
FIG. 1 is a schematic block diagram illustrating an embodiment of a cellular network.

FIG. 1 depicts a cellular network 100. The cellular network 100 may be any cellular radio network comprising a Radio Network Controller, RNC, capable of establishing and routing a data packet session through different network transmission paths exploiting different routing protocols, the radio communications network may e.g. be a GERAN (GSM EDGE Radio Access Network), a UTRAN network, a WCDMA network, a CDMA 2000 network, an IS-95 network, a Digital Advanced Mobile Phone Service (D-AMPS) network etc.

The cellular network 100 comprises a first Radio Network Controller (RNC) 105 and a second RNC 110. In this example the radio access networks, which are not explicitly indicated in the FIG. 1, are of a UTRAN type. However, the term RNC should here not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the Base Station Controllers (BSCs) of the CDMA 2000 network. The second RNC 110 may be a home nodeB gateway. It is to be understood that although one second RNC 110 is illustrated in the FIG. 1, there may be more, not shown, second RNCs 110 in the cellular network 100.

The cellular network 100 further comprises base stations that handle radio transmission and reception within one or more cells. In the FIG. 1, six base stations are depicted: a first base station 115, a second base station 120, a third base station 125, a fourth base station 130, a fifth base station 135, and a sixth base station 140. The base stations may be e.g. a Radio Base Stations (RBS), which sometimes may be referred to as e.g. "nodeB", "B node", or Base Transceiver Station (BTS), depending on the technology and terminology used. The base stations may be of different classes such as e.g. macro NodeBs, home NodeBs or pico base stations, based on transmission power and thereby also on cell size. In this example, the first base station 115 is a macro nodeB, and the other base stations 120, 125, 130, 135, 140 are pico base stations.

The first base station 115 is in this example controlled by the first RNC 105, while the other base stations 120, 125, 130, 135, 140 are controlled by the second RNC 110.

The cellular network 100 further comprises cells. Each cell covers a geographical area. The radio coverage in a cell is provided by a base station serving the cell in question. The first base station 115 serves a first cell 145. The second base station 120 serves a second cell 150. The third base station 125 serves a third cell 155. The fourth base station 130 serves a fourth cell 160. The fifth base station 135 serves a fifth cell 165, and the sixth base station 140 serves a sixth cell 170. In this example, the first cell 145 is a so called macro cell, and the other cells 150, 155, 160, 165, 170 are so called underlay cells in the form of pico cells. In another embodiment, these cells may be of another type. There may be more than one cell covering the same geographical area, which is the case in the example in FIG. 1, where the first cell 145 covers a relatively large area, and the other depicted underlay cells 150-170 are so called pico cells, covering small areas within the macro cell. Also, the fifth cell 165 and the sixth cell 170 overlap each other.

The cellular network 100 further comprises a Core Network (CN) 175.

A user equipment 180 depicted in FIG. 1 is served by the first cell 145, which is the cell where it is currently located. The user equipment 180 is a mobile terminal by which a subscriber can access services offered by the CN 175. The user equipment 180 may be for example a communication device such as a mobile telephone, cellular telephone, laptop or tablet computer, sometimes referred to as a surf plate, with wireless capability. The user equipment 180 may be a portable, pocket-storable, hand-held, computer-comprised, or vehicle-mounted mobile device, enabled to communicate voice and/or data, via the cellular network 100, with another entity, such as another mobile station or a server.

A radio link is a representation of the communication between the user equipment 180 and a base station via a cell served by the base station, such as for example a radio link 185 depicted in FIG. 1, between the user equipment 180 and the first base station 115.

Also illustrated in the FIG. 1, are interfaces connecting the different nodes in the cellular network 100. The connections between the base stations and the RNCs may be so called Iub interfaces.

Further, an interface 190 connects the first RNC 105 and the second RNC 110. This interface 190 may be referred to as a Iur interface.

On these Iub/Iur interfaces user data is transported on so-called transport bearers.

Also illustrated in the FIG. 1 is a so called Operations and Maintenance (OAM) node 195. This OAM node 195 may be a domain manager, managing nodes within a region, may be separated for different radio access technologies; a network manager, managing one or more domain managers; or a home base station Management system, managing home base stations. The OAM node 195 handles configuration of network elements such as for example the first RNC 105 and the second RNC 110, and the base stations 115, 120, 125, 130, 135, 140, both as part of an initial configuration as well as reconfigurations while in operation; performance observation of the network elements by gathering performance indicators from the nodes and further processing such information to present and visualize; fault management of the network elements, receiving and processing fault indications from the network elements, determining suitable actions, or similar.

To provide mobility to user equipments such as the user equipment 180 in the cellular network 100, it is possible to provide handovers in the cellular network 100. The handover may be a change of serving cell, so that the user equipment 180 being served by one cell, becomes served by another, so called candidate cell, instead. A handover may also mean addition of a radio link to a candidate cell without removing established radio links to other cells; or replacement of one of the existing radio links by a radio link to a candidate cell. Communication that involves a multitude of cells may be referred to as macro diversity, soft handover, softer handover or coordinated multipoint, etc. The set of cells with which the user equipment 180 has radio links is referred to as an active set. Hence, a handover of the user equipment 180 includes the setup of a radio link connection between the user equipment 180 and a candidate cell, so that the candidate cell may become the serving cell for the user equipment 180.

The first RNC 105 is a so called serving RNC for the user equipment 180. The term serving RNC will be described in the following.

On a per RAN-UE connection basis, an RNC may have two different roles.

As a so called Serving RNC (SRNC) for the user equipment 180, the first RNC 105 is in charge of the connection with the user equipment 180, i.e. has control of this connection inside the RAN of the cellular network 100. The SRNC is connected to the CN 175.

So called Drift RNCs (DRNC)s, are RNCs that supports the SRNC with radio resources for a connection with the user equipment 180 when the user equipment 180 needs radio resources in cells controlled by these DRNCs.

The radio access network decides the role of an RNC, i.e. SRNC or DRNC, when the UE-RAN connection is established. Normally, the RNC that controls the cell where the connection to a user equipment is initially established is assigned the SRNC role for this user equipment connection. For the sake of clarity, the user equipment 180 is here depicted as still being located in a cell controlled by its serving RNC, i.e. in the first cell 145 controlled by the first RNC 105 in this example.

As the user equipment 180 moves, the connection is maintained by establishing radio communication via new cells by performing handovers as described above, possibly also involving cells controlled by other RNCs. The other RNCs may be for example the illustrated second RNC 110, or other such not shown RNCs which then are assigned a DRNC role for the user equipment 180. It is hence to be understood that the user equipment 180, due to its mobility, in other embodiments be located in a cell which is not served by a base station controlled by the first RNC 105, while still having the first RNC 105 as its SRNC.

UTRAN features soft handover, where the user equipment 180 may be allocated a multitude of radio links. These radio links may be with the same base station or different base stations. Furthermore, the base stations may be controlled by different RNCs.

Neighbor cell relations are used to facilitate mobility of user equipments between base stations. In UTRAN, the user equipment 180 is provided with a list of plausible candidate cells from its serving RNC, i.e. the first RNC 105 in this example. The list may be referred to as a neighbor cell list, and may have a maximum of 31 intra-frequency neighbors.

A set of cells with radio links to the user equipment 180 are referred to as the active set of cells, while additional cells listed in the neighbor cell relation list constitute a monitored set of cells which are searched for and reported upon detection. Moreover, the user equipment 180 may also consider, detect and report cells not listed in the neighbor cell list. These cells may be referred as a detected set of cells. One issue with detected set cells may be significantly looser reporting requirements, for example within 30 seconds.

A well-defined signature sequence is broadcast in each cell in the cellular network 100, which well-defined signature sequence may be referred to as a so called scrambling code. The scrambling codes are enumerated and associated with a cell identifier. There may be 512 different scrambling codes and associated cell identities in UTRAN.

Handover from one cell to another is performed based on so called measurement reports from the user equipment 180, in which the user equipment 180 reports which scrambling code it has detected. A measurement report is sent to the SRNC, i.e. to the first RNC 105 in this example, and the SRNC may based on the report identify candidate cells for handover of the user equipment 180.

As part of the development towards embodiments herein, a problem will first be identified and discussed below, with reference to FIG. 1.

The scrambling codes and associated cell identities are reused in the cellular network 100. Therefore they are not globally unique.

Ideally, these non-unique scrambling codes should at least be locally unique in the cellular network 100. However, with many small cells such as for example the pico cells 150, 155, 160, 165 and 170 depicted in FIG. 1, and possibly also a reserved range of scrambling codes for small cells, this might not be the case. Hence, it may be the case that two or more pico cells within the coverage of the same macro cell are assigned the same scrambling code. In the example in FIG. 1, a first scrambling code, SC1, is reused in the third cell 155, the fifth cell 165 and the sixth cell 170. A second scrambling code, SC2, is reused in the second cell 150 and the fourth cell 160.

This means that when the user equipment 180 sends a measurement report related to one of the scrambling codes SC1 or SC2 to the first RNC 105, the first RNC 105 may not, based on the measurement report, uniquely identify which cell the reported scrambling code originated from. This may prevent unique identification of a candidate cell for a handover and is referred to as scrambling code confusion.

Moreover, when cells with overlapping coverage areas are both reusing the same scrambling code, such as is the case in the fifth cell 165 and the sixth cell 170 in this example, there is a so called scrambling code collision.

Also, the limited neighbor cell relation list length, which may be limited to 31 different scrambling code indexes, and the loose detected set reporting requirements may render seamless mobility from the macro cell 145 to one of the pico cells 150, 155, 160, 165, 170 difficult.

Figure 2:
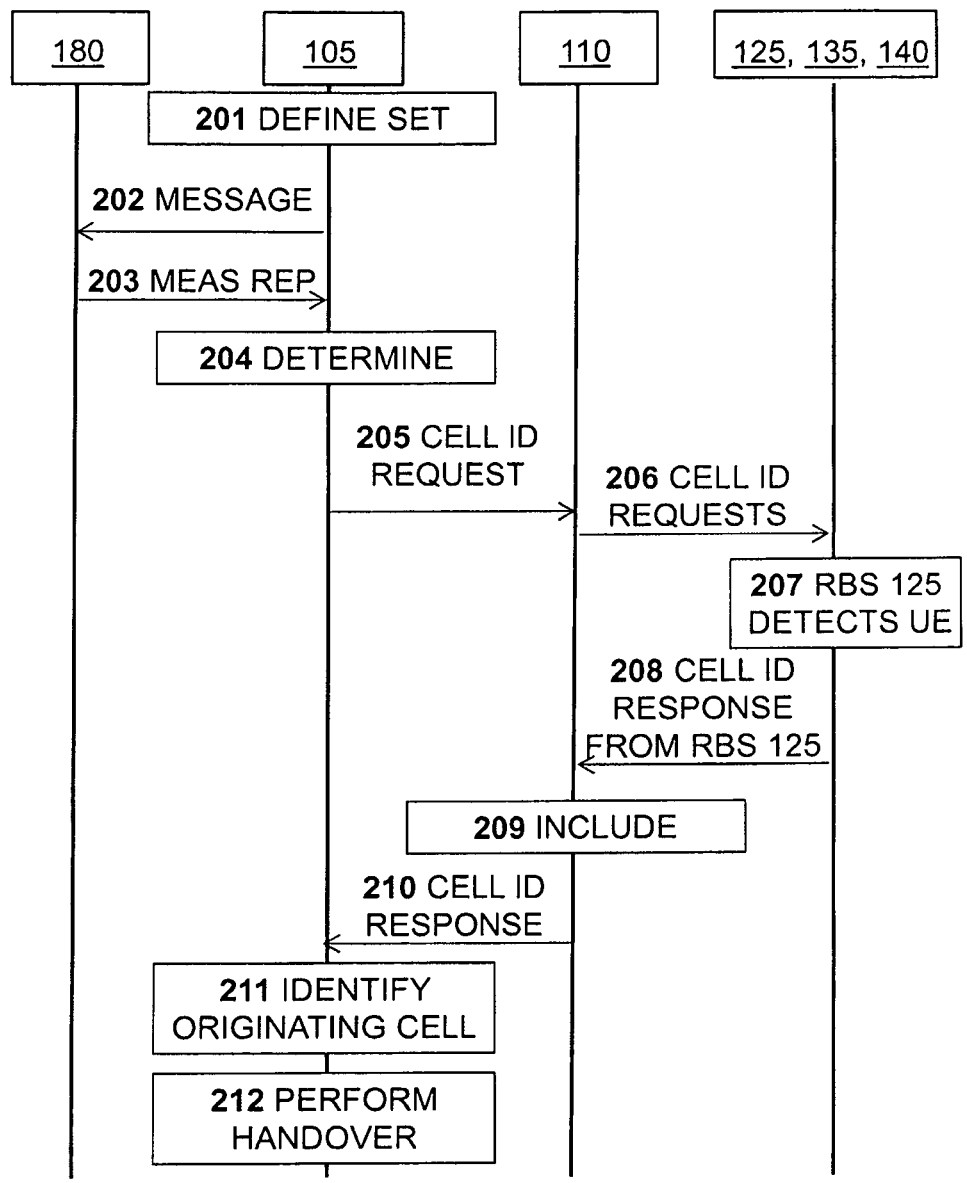
FIG. 2 is a combined signalling scheme and flowchart illustrating embodiments in a cellular network.

FIG. 2 illustrates a method for handling the reuse of the scrambling codes in the cellular network 100 according to some embodiments herein. For the sake of clarity, reference will also be made to the numerals in FIG. 1. As previously mentioned, the first RNC 105 is the SRNC for the user equipment 180, and hence the user equipment 180 sends its measurement reports to the first RNC 105. The first RNC 105 dentifies candidate cells for handover based on the reports, and the first RNC 105 also provides the user equipment 180 with its neighbor cell relation list.

In this example, it is assumed that the user equipment 180 is located in the first cell 145 served by the first base station 115, and that the user equipment 180 is approaching the third cell 155. Hence, there is an upcoming need for a handover to be performed to the third cell 155.

It is further assumed that there is a scrambling code confusion as previously described in relation to FIG. 1, because the same scrambling code SC1 is reused in the third cell 155, in the fifth cell 165 and the in sixth cell 170.

The method comprises the following actions, which may in other embodiments be taken in another suitable order.

In action 201 the first RNC 105 defines a set of scrambling codes which are locally reused in at least two cells in the cellular network 100. In this example, the set of scrambling codes comprises the previously mentioned first scrambling code SC1 which is reused in cells 155, 165 and 170, and the second scrambling code SC2 which is used in cells 150 and 160. The defining may in some embodiments comprise an, in FIG. 2 not shown, action of receiving the set or a part of the set of scrambling codes from the OAM node 195.

In action 202, the first RNC 105 sends the defined set of scrambling codes in a message to the user equipment 180. The message commands the user equipment 180 to include the defined set of scrambling codes in its neighbour cell relation list, and to report detection of these scrambling codes according to the requirements for scrambling codes included in this neighbor cell relation list.

In action 203, the user equipment 180 sends a measurement report to the first RNC 105. The measurement report indicates that the user equipment 180 has detected the first scrambling code SC1. Hence, the measurement report is related to the first scrambling code SC1. The cell from which the first scrambling code SC1 originated when it was heard by the user equipment 180 in this example was the third cell 155 served by the third base station 125, which is the cell that the user equipment 180 is approaching in this example, as previously mentioned.

In action 204, the first RNC 105 determines that the reported first scrambling code SC1 is comprised in the defined set of scrambling codes. As a result, the first RNC 105 knows that the reported first scrambling code SC1 is one of the locally reused scrambling codes.

In action 205, having determined that the reported first scrambling code SC1 belongs to the defined set, the first RNC 105 initiates a process for identifying an originating cell among the cells that locally reuse the reported first scrambling code SC1.

This is performed by sending a cell identification request to the respective base stations 125, 135 and 140 that serves the respective cells 155, 165 and 170 in which the reported first scrambling code SC1 is locally reused. The cell identification request comprises an identifier of the user equipment 180 and commands the respective base stations 125, 135, 140 to detect the user equipment 180 within the cell the respective base stations 125, 135, 140 is serving. The detection is to be performed by detecting the identifier of the user equipment 180 within the respective cell 155, 165, 170. In this example, since the base stations 125, 135 and 140 in question are controlled by the second RNC 110, the cell identification requests are not sent directly to the base stations 125, 135, 140. Instead, the cell identification request is sent via the second RNC 110 over Iur. The cell identification request is hence received by the second RNC 110.

In action 206, the cell identification request is forwarded from the second RNC 110 to the respective base stations 125, 135 and 140 over Iub.

In action 207, the third base station 125 detects the identifier of the user equipment 180 in its cell, i.e. the third cell 155. In this example, the identifier of the user equipment 180 is only detected within the third cell 155, and not in any of the other two cells 165 and 170.

In action 208, the third base station 125 sends a cell identification response over Iub to the second RNC 110, indicating that the identifier of the user equipment 180 has been detected within the third cell 155. The third cell may hence be referred to as a responding cell in this example. The cell identification response is received by the second RNC 110.

In action 209, the second RNC 110 includes a unique identifier of the responding cell, i.e. the third cell 155, in the cell identification response that is received in action 208. This is to enable a unique identification of the responding cell in the first RNC 105.

In action 210, the second RNC 110 then sends the cell identification response comprising the unique identifier over Iur to the first RNC 105. The first RNC 105 receives the cell identification response.

In action 211, the first RNC 105 identifies the originating cell as the one responding cell 155. This can be done thanks to only one cell responding to the cell identification request and thanks to the cell identification response comprising the unique identifier of the responding cell in question, i.e. of the third cell 155. The identification may in some embodiments herein be performed by association even if the unique identifier of the responding cell is not explicitly included in the cell identification response sent over Iur in action 210.

In action 212, the first RNC 105 performs a handover of the user equipment 180 to the identified third cell 155.

The above described embodiment illustrates how a scrambling confusion, i.e. a case such as the described case where more than one cell locally reuses the same scrambling code, can be handled and a candidate cell identified thanks to some embodiments herein. In the above described example, the handover is possible to perform to the correct cell, i.e. the cell that was actually detected and reported by the user equipment 180 in action 203, even though the reported first scrambling code SC1 was not locally unique.

Figure 3:
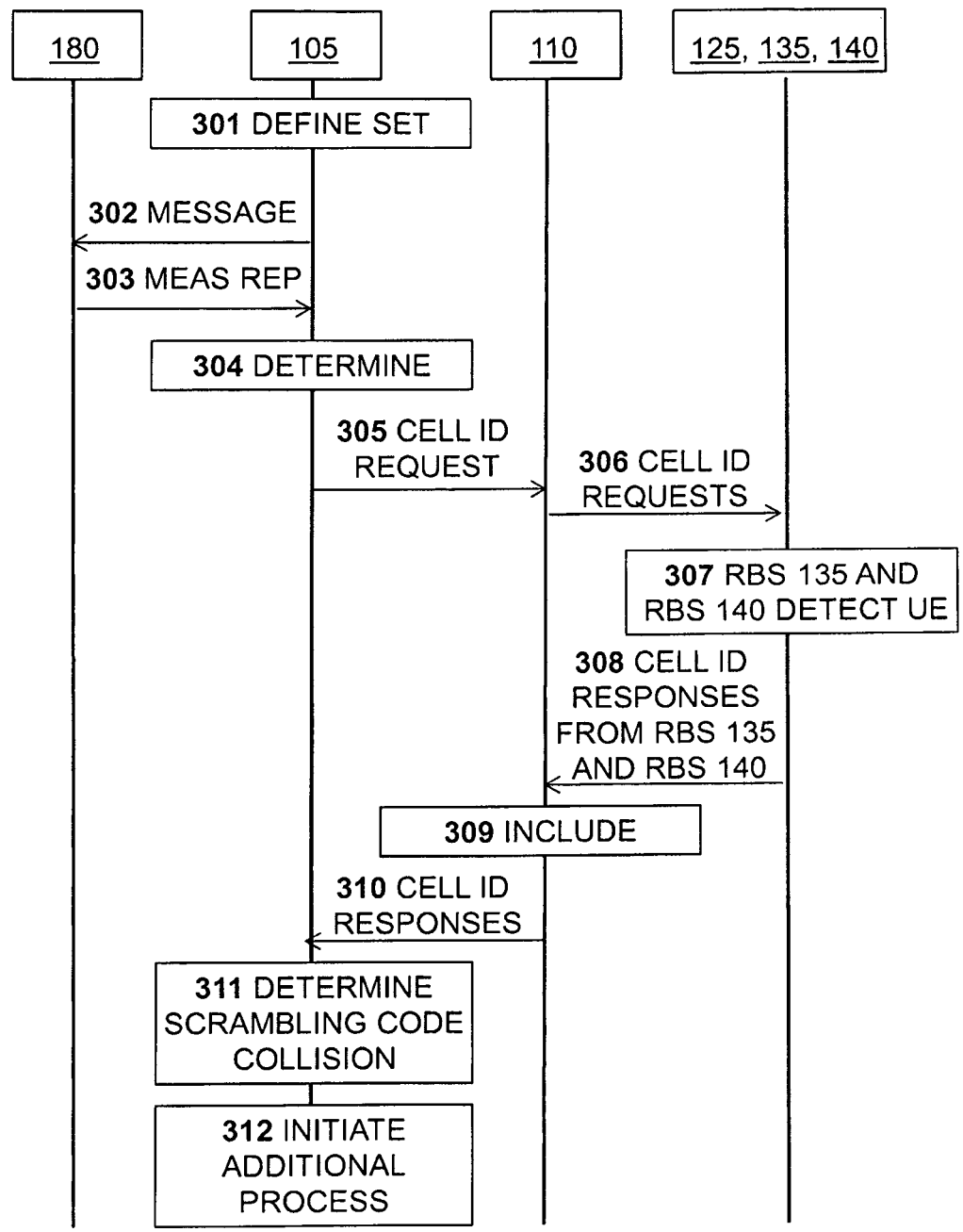
FIG. 3 is a combined signalling scheme and flowchart illustrating embodiments in a cellular network.

FIG. 3 also illustrates how a method for handling a reuse of a scrambling code in the cellular network 100 may be implemented according to some embodiments herein. For the sake of clarity, reference will here too be made to the numerals in FIG. 1. As previously mentioned, the first RNC 105 is the SRNC for the user equipment 180, and hence the user equipment 180 sends its measurement reports to the first RNC 105, and the first RNC 105 provides the user equipment 180 with its neighbor cell relation list.

In this example, it is assumed that the user equipment 180 is located in the first cell 145 served by the first base station 115, and that the user equipment 180 is approaching the fifth cell 165. Hence, in this example, there is an upcoming need for a handover to be performed to the fifth cell 165.

It is further assumed that there is a scrambling code confusion as previously described in relation to FIG. 1, because the first scrambling code SC1 is reused in the third cell 155, the fifth cell 165 and in the sixth cell 170.

The method comprises the following actions, which may in other embodiments be taken in another suitable order.

In action 301, the first RNC 105 defines a set of scrambling codes which are locally reused in at least two cells in the cellular network 100. In this example, the set of scrambling codes comprises the previously mentioned first scrambling code SC1 which is reused in cells 155, 165 and 170, and the second scrambling code SC2 which is used in cells 150 and 160. The defining may in some embodiments comprise an, in FIG. 3 not shown, action of receiving the set or a part of the set of scrambling codes from the OAM node 195.

In action 302, the first RNC 105 sends the defined set of scrambling codes in a message to the user equipment 180. The message commands the user equipment 180 to include the defined set of scrambling codes in its neighbor cell relation list, and to report detection of these scrambling codes according to the requirements for scrambling codes included in this neighbor cell relation list.

In action 303, the user equipment 180 sends a measurement report to the first RNC 105. The measurement report indicates that the user equipment 180 has detected the first scrambling code SC1, i.e. that it has heard or detected this scrambling code when broadcast within an originating cell among the three cells that reuse this scrambling code. Hence, the measurement report is related to the first scrambling code SC1.

The cell from which the first scrambling code SC1 originated when it was heard by the user equipment 180 in this example was the fifth cell 165 served by the fifth base station 135 which is the cell that it is approaching in this example.

In action 304, the first RNC 105 determines that the reported first scrambling code SC1 is comprised in the defined set of scrambling codes. As a result, the first RNC 105 knows that the reported first scrambling code SC1 is a locally reused scrambling code and hence possibly ambiguous.

In action 305, based on the determination in action 304, the first RNC 105 initiates a process for identifying an originating cell among the cells that locally reuse the reported first scrambling code SC1. This initiation is performed by sending a cell identification request to the respective base stations 125, 135 and 140 that serve the respective cells 155, 165 and 170 in which the reported first scrambling code SC1 is locally reused. The cell identification request comprises an identifier of the user equipment 180 and commands the respective base stations 125, 135, 140 to detect the user equipment 180 within the cell the respective base stations 125, 135, 140 is serving. The detection is to be performed by detecting the identifier of the user equipment 180 within the respective cell 155, 165, 170. In this example, since the base stations 125, 135 and 140 in question are controlled by the second RNC 110, the cell identification requests are not sent directly to the base stations 125, 135, 140. Instead, the cell identification request is sent via the second RNC 110 over Iur. The second RNC 110 receives the cell identification request.

In action 306, the cell identification request is forwarded from the second RNC 110 to the respective base stations 125, 135 and 140.

In action 307, the fifth base station 135 detects the identifier of the user equipment 180 within the fifth cell 165. However, the identifier of the user equipment 180 is also detected within the sixth cell 170 by the sixth base station 140. This is possible when the user equipment 180 is in, or near, the overlapping area of the fifth cell 165 and the sixth cell 170. The situation in this example may hence, as previously mentioned, be referred to as a scrambling code collision.

Hence, in action 308, the fifth base station 135 and the sixth base station 140 both send a respective cell identification response to the second RNC 110, indicating that the identifier of the user equipment 180 has been detected within both the fifth cell 165 and within the sixth cell 170. Hence there are two responding cells in this example. The two cell identification responses are received by the second RNC 110 over Iub.

In action 309, the second RNC 110 includes a unique identifier of the responding fifth cell 165, and a unique identifier of the responding sixth cell 170 in the respective cell identification responses that it received in action 308. This is to enable a unique identification of both the responding cells in the first RNC 105.

In action 310, the second RNC 110 then sends the cell identification responses to the first RNC 105 over Iur.

In action 311, the first RNC 105 determines that there is a scrambling code collision between the two responding cells. This may be done based on more than one cell identification responses being received.

In action 312, the first RNC 105 initiates based on the determination of the scrambling code collision, an additional process to prevent further reuse of the scrambling code SC1 by both the fifth cell 165 and the sixth cell 170. This is done to solve the scrambling code collision.

Since there is more than one responding cell in this example, the first RNC 105 cannot uniquely define the originating cell that was detected and reported by the user equipment 180 in action 303. However, in some embodiments herein, the first RNC 105 still decides to perform a handover to one of the responding cells. This may be better than not performing any handover at all.

The previous example described in relation to FIG. 2 illustrated how according to some embodiments herein, reported cells can be uniquely identified despite scrambling code confusion.

The above example described in relation to FIG. 3 has shown that the cell identification mechanism according to some embodiments herein may also be used to detect scrambling code collisions, and to trigger a mechanism to reassign a collision free scrambling code to one of the colliding cells.

Hence, thanks to embodiments herein, scrambling codes need to be assigned to avoid collisions, but not confusion, which simplifies the assignment task, and reduces a need for many scrambling codes to be reserved for pico cells.

Figure 4:
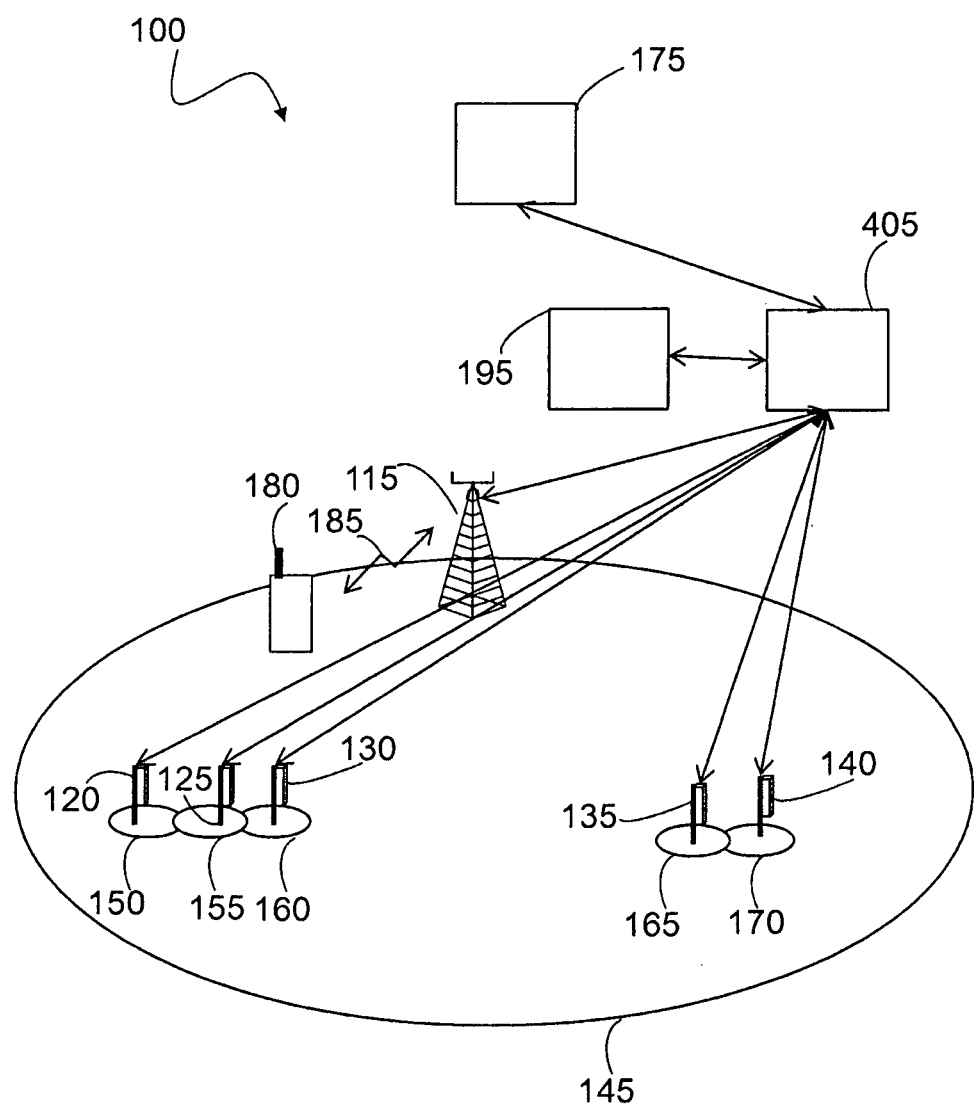
FIG. 4 is a schematic block diagram illustrating an embodiment of a cellular network.

FIG. 4 depicts another embodiment of the cellular network 100 depicted in FIG. 1. All numerals which are the same as in FIG. 1 are the same references. There is however a difference with regards to the RNCs. While there are two RNCs in the FIG. 1, only the first RNC is present in the FIG. 4, referred to as a first RNC 405 in this figure. This is because in the example in FIG. 4, the first RNC 405 controls the base station 120, 125, 130, 135 and 140 as well as the first base station 115. The first RNC 405 may be of any of the previously in relation to FIG. 1 described types.

In the following, the example scenarios previously described in relation to FIGS. 2 and 3 with reference to FIG. 1, will now be described with reference to FIG. 4 where there is only on RNC involved, the first RNC 405.

Figure 5:
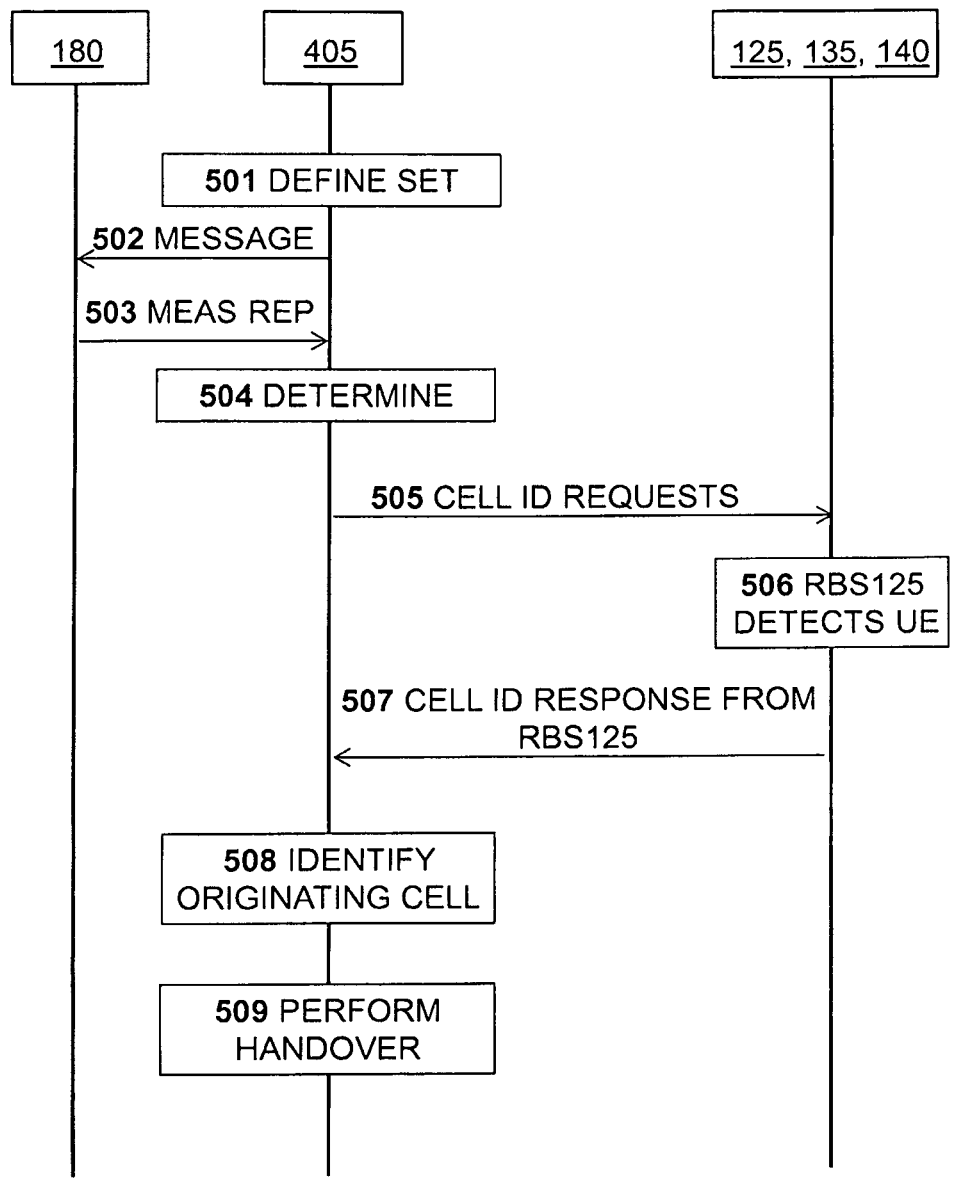
FIG. 5 is a combined signalling scheme and flowchart illustrating embodiments in a cellular network.

FIG. 5 illustrates how a method for handling a reuse of a scrambling code may be implemented in the cellular network 100 depicted in FIG. 4, according to some embodiments herein. For the sake of clarity, reference will also be made to the numerals in FIG. 4. The first RNC 405 is the SRNC for the user equipment 180, and hence the user equipment 180 sends its measurement reports to the first RNC 405, and the first RNC 105 provides the user equipment 180 with its neighbor cell relation list.

In this example it is assumed that the user equipment 180 is located in the first cell 145 served by the first base station 115, and that the user equipment 180 is approaching the third cell 155. Hence, in this example, there is an upcoming need for a handover to be performed to the third cell 155.

It is further assumed that there is a scrambling code confusion as previously described in relation to FIG. 1 because the first scrambling code SC1 is reused in the third cell 155, in the fifth cell 165 and in the sixth cell 170.

The method comprises the following actions, which may in other embodiments be taken in another suitable order.

In action 501, the first RNC 405 defines a set of scrambling codes which are locally reused in at least two cells in the cellular network 100. In this example, the set of scrambling codes comprises the previously mentioned first scrambling code SC1 which is reused in cells 155, 165 and 170, and the second scrambling code SC2 which is reused in cells 150 and 160. The defining may in some embodiments comprise an, in FIG. 5 not shown, action of receiving the set or a part of the set of scrambling codes from the OAM node 195.

In action 502, the first RNC 405 sends the defined set of scrambling codes in a message to the user equipment 180. The message commands the user equipment 180 to include the defined set of scrambling codes in its neighbor cell relation list, and to report detection of these scrambling codes according to the requirements for scrambling codes included in this neighbor cell relation list.

In action 503, the user equipment 180 sends a measurement report to the first RNC 405. The measurement report indicates that the user equipment 180 has detected the first scrambling code SC1. Hence, the measurement report is related to the first scrambling code SC1.

The cell from which the first scrambling code SR1 originated when it was heard by the user equipment 180 in this example was the third cell 155 served by the third base station 125, which is one of the three base stations that reuse the same scrambling code locally in this example.

In action 504, the first RNC 405 determines that the reported first scrambling code SC1 is comprised in the defined set of scrambling codes. As a result, the first RNC 405 knows that the reported first scrambling code SC1 is a locally reused scrambling code.

In action 505, the first RNC 405 initiates a process for identifying an originating cell among the cells that locally reuse the reported first scrambling code SC1. This is performed by sending a cell identification request to the respective base stations 125, 135 and 140 that serves the respective cells 155, 165 and 170 in which the reported scrambling code SC1 is locally reused. The cell identification request comprises an identifier of the user equipment 180 and commands the respective base stations 125, 135, 140 to detect the user equipment 180 within the cell the respective base stations 125, 135, 140 is serving. The detection is to be performed by detecting the identifier of the user equipment 180 within the respective cell 155, 165, 170. In this example, since the base stations 125, 135 and 140 in question are controlled by the first RNC 405 itself, the cell identification requests are sent directly to the base stations 125, 135, 140 over Iub.

In action 506, the third base station 125 detects the identifier of the user equipment 180 in its cell, i.e. the third cell 155. In this example, the identifier of the user equipment 180 is only detected within the third cell 155.

In action 507, the third base station 125 sends a cell identification response to the first RNC 405, indicating that the identifier of the user equipment 180 has been detected within the third cell 155, which may hence be referred to as a responding cell in this example. The cell identification response is received by the first RNC 405. In this example, since the base station 125 is controlled by the first RNC 405 itself, the cell identification responses is sent directly from the base station 125 to the first RNC 405 over Iub. The first RNC 405 receives the cell identification response.

In action 508, the first RNC 405 identifies the originating cell as the one responding cell, the third cell 155. This can be done thanks to only one cell responding to the cell identification request. Since the first RNC 405 controls the serving base station 125 of the responding cell it may know its unique identity, or derive it by association.

In action 509, the first RNC 405 performs a handover of the user equipment 180 to the identified third cell 155.

The above described embodiment illustrates how a scrambling confusion, i.e. a case such as the described case where the same scrambling code is locally reused in more than one cell can be handled thanks to some embodiments herein. In the above described example, a handover is possible to perform to the correct cell, i.e. the cell that was actually detected and reported by the user equipment 180 in action 503, even though the reported first scrambling code SC1 was not locally unique.

Figure 6:
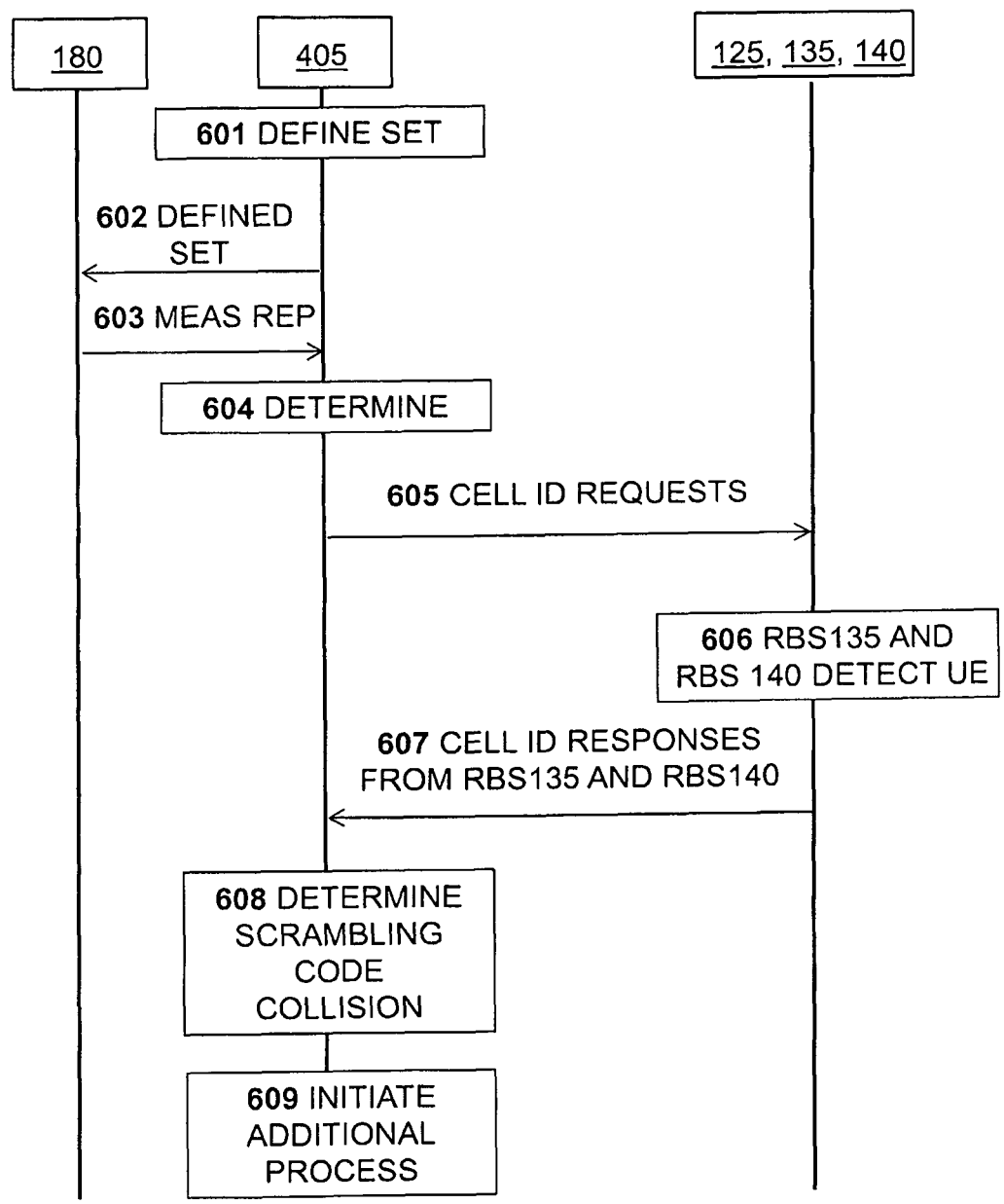
FIG. 6 is a combined signalling scheme and flowchart illustrating embodiments in a cellular network.

FIG. 6 also illustrates how a method for handling a reuse of a scrambling code may be implemented in the cellular network 100 depicted in FIG. 4, according to some embodiments herein. For the sake of clarity, reference will here too be made to the numerals in FIG. 4. The first RNC 405 is the SRNC for the user equipment 180, and hence the user equipment 180 sends its measurement reports to the first RNC 405, and the first RNC 105 provides the user equipment 180 with its neighbor cell relation list.

In this example, it is assumed that the user equipment 180 is located in the first cell 145 served by the first base station 115, and that the user equipment 180 is approaching the fifth cell 165. Hence, in this example, there is an upcoming need for a handover to be performed to the fifth cell 165.

It is further assumed that there is a scrambling code confusion as previously described in relation to FIG. 1 because the first scrambling code SC1 is reused in the third cell 155, the fifth cell 165 and the sixth cell 170.

The method comprises the following actions, which may in other embodiments be taken in another suitable order.

In action 601, the first RNC 405 defines a set of scrambling codes which are locally reused in at least two cells in the cellular network 100. In this example, the set of scrambling codes comprises the previously mentioned first scrambling code SC1 which is reused in cells 155, 165 and 170, and the second scrambling code SC2 which is used in cells 150 and 160. The defining may in some embodiments comprise an, in FIG. 6 not shown, action of receiving the set or a part of the set of scrambling codes from the OAM node 195.

In action 602, the first RNC 405 sends the defined set of scrambling codes in a message to the user equipment 180. The message commands the user equipment 180 to include the defined set of scrambling codes in its neighbor cell relation list, and to report detection of these scrambling codes according to the requirements for scrambling codes included in this neighbor cell relation list.

In action 603, the user equipment 180 sends a measurement report to the first RNC 405. The measurement report indicates that the user equipment 180 has detected the first scrambling code SC1, i.e. that it has heard or detected this scrambling code when broadcast within an originating cell among the three cells that reuse this scrambling code. Hence, the measurement report is related to the first scrambling code SC1.

The cell from which the first scrambling code SC1 originated when it was heard by the user equipment 180 in this example was the fifth cell 165 served by the fifth base station 135, which is one of the three base stations that reuse the same scrambling code locally in this example.

In action 604, the first RNC 405 determines that the reported first scrambling code SC1 is comprised in the defined set of scrambling codes. As a result, the first RNC 405 knows that the reported first scrambling code SC1 is a locally reused scrambling code.

In action 605, the first RNC 405 initiates a process for identifying an originating cell among the cells that locally reuse the reported first scrambling code SC1. This is performed by sending a cell identification request to the respective base stations 125, 135 and 140 that serves the respective cells 155, 165 and 170 in which the reported scrambling code SC1 is locally reused. The cell identification request comprises an identifier of the user equipment 180 and commands the respective base stations 125, 135, 140 to detect the user equipment 180 within the cell the respective base stations 125, 135, 140 is serving. The detection is to be performed by detecting the identifier of the user equipment 180 within the respective cell 155, 165, 170. In this example, since the base stations 125, 135 and 140 in question are controlled by the first RNC 405 itself, the cell identification requests are sent directly to the base stations 125, 135, 140 over Iub. The cell identification requests are received by the base stations 125, 135, 140.

In action 606, the fifth base station 135 detects the identifier of the user equipment 180 within the fifth cell 165. However, the identifier of the user equipment 180 is also detected within the sixth cell 170 by the sixth base station 140. This is possible when the user equipment 180 is in, or near, the overlapping area of the fifth cell 165 and the sixth cell 170. This may, as previously mentioned, be referred to as a scrambling code collision.

Hence, in action 607, the fifth base station 135 and the sixth base station 140 both send a respective cell identification response to the first RNC 405, indicating that the identifier of the user equipment 180 has been detected within both the fifth cell 165 and within the sixth cell 170, which may hence both be referred to as responding cells in this example. The two cell identification responses are received by the first RNC 405. In this example, since the base stations 135 and 140 in question are controlled by the first RNC 405 itself, the cell identification responses are sent directly to the first RNC 405 from the fifth base station 165 and from the sixth base station 170 over Iub.

In action 608, the first RNC 405 determines that there is a scrambling code collision between the two responding cells. This may be done based on more than one cell identification responses being received.

In action 609, the first RNC 405 initiates, based on the determination in action 608 that there is a scrambling code collision, an additional process to prevent further reuse of the first scrambling code SC1 by both the fifth cell 165 and the sixth cell 170. This is done to solve the scrambling code collision.

Since there is more than one responding cell in this example, the first RNC 405 cannot uniquely define the originating cell that was detected and reported by the user equipment 180 in action 603. However, in some embodiments herein, the first RNC 405 still decides to perform a handover to one of the responding cells. This may be better than not performing any handover at all.

The above described embodiment illustrates how a scrambling collision, i.e. a case such as the described case where more than one cell locally reuses the same scrambling code and both are within reach of the user equipment 180, can be handled thanks to some embodiments herein.

Figure 7:
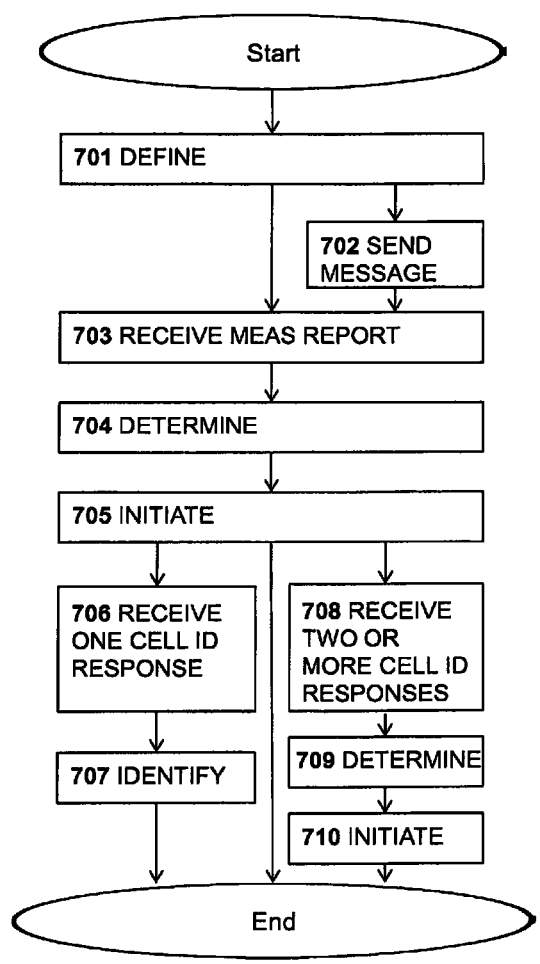
FIG. 7 is a flowchart depicting embodiments of a method in a first radio network controller.

Embodiments herein relating to a method in the first radio network controller, RNC, 105, 405 for handling a reuse of a scrambling code in a cellular network 100, will now be further elaborated and described with reference to the flowchart depicted in FIG. 7. These embodiments will be described in a more general way.

The first RNC 105, 405 may be of any of the in relation to FIG. 1-6 previously described types, as may cellular network 100, the user equipment 180, the base stations 115, 120, 125, 130, 135 and 140, as well as the second RNC, 110 that will be referred to below.

The method comprises the following actions which may be taken in any suitable order.

Action 701

The first RNC 105, 405 defines a set of scrambling codes. Each scrambling code in the defined set is locally reused in at least two cells in the cellular network 100.

According to some embodiments, the scrambling codes in the defined set are reserved for use in cells which are served by base stations using transmission powers below a threshold, for example reserved for pico cells, such as the pico cells 150, 155, 160, 165, 170.

According to some embodiments herein, the defined set comprises a reserved range of scrambling codes from which pico cells under a specific macro cell are allocated scrambling codes.

According to some embodiments herein, the defined set comprises a number of scrambling codes determined as a difference between a total number of neighbour cell scrambling codes that the first RNC 105, 405 is able to configure for the user equipment 180 and an estimated number of neighbour cells that are not underlay cells.

According to some embodiments, pico cell scrambling codes are assigned from a reserved range, or set of scrambling codes, and the defined set may then be this reserved range. For example, N=10 codes may be reserved to allow for a scrambling code reuse factor greater than 1 within a cluster of pico cells. The same codes may be reserved for all picos in the cellular network 100, or there may be different ranges or sets reserved for pico cells under different macro cells or base stations.

If N codes are reserved for pico cells, then there may be 31−N (=21, if N=10) places left for macro neighbor cells in the intra-frequency neighbor cell relation list. All reserved pico scrambling codes may then be included in the defined set, and also in the neighbor cell relation list even though there might not be any pico cells in the vicinity using one or several of the scrambling codes in question.

According to some embodiments, the defining comprises obtaining the set of scrambling codes from the Operations and Maintenance node 195.

Action 702

This is an optional action, according to which the first RNC 105, 405 sends a message to the user equipment 180. The message commands the user equipment 180 to use a neighbour cell relation list comprising the defined set of scrambling codes.

Thanks to the defined set being comprised in the neighbour cell relation list, the required time of the user equipment 180 to detect, measure and report the scrambling codes may be shorter compared to the requirements for reporting scrambling codes not comprised in the neighbour cell relation list. Including the defined set in the neighbor cell relation list may mean that monitored set reporting requirements applies. These are stricter than the corresponding for detected set cells. Stricter measurement reporting requirements may be advantageous to ensure that the measurement report related to the scrambling code in the defined set is reported in due time for an upcoming handover to be performed.

Action 703

The first RNC 105, 405 receives a measurement report from the user equipment 180. The measurement report is related to a scrambling code that is comprised in the defined set of scrambling codes.

By "related to a scrambling code" is understood that the measurement report comprises an indicator that the scrambling code has been detected by the user equipment 180. The indicator may be for example an index in a neighbour cell relation list which index is associated to the scrambling code in question.

Action 704

The first RNC 105, 405 determines that the reported scrambling code is comprised in the defined set of scrambling codes.

Action 705

The first RNC 105, 405 initiates, based on the determination in action 704, a process for identifying, among the at least two cells in which the reported scrambling code is locally reused, an originating cell from which the reported scrambling code originates.

According to some embodiments, the initiating is performed by sending a respective cell identification request to each respective base station that serves a respective cell of the at least two cells in which the reported scrambling code is locally reused. The cell identification request comprises an identifier of the user equipment 180. The cell identification request commands the respective base station to detect the identifier of the user equipment 180 within the respective cell.

The cell identification request may be routed to a cell or cells using the reported scrambling code. The cell identification request may be a Radio Link Setup Request. The cell identification request may provide base stations serving the target cells, i.e. serving the cells to which the cell identification request is directed, with sufficient information to uniquely identify the user equipment 180. This information may be an uplink scrambling code of the user equipment 180.

Thanks to the cell identification request comprising the identifier of the user equipment 180 the base station receiving the cell identification request can try to detect the identifier in the respective cell.

The cell identification requests may be sent explicitly to each respective base station 125, 135, 140, or implicitly to all or some of the base stations in question by sending the cell identification request via a control node, such as the second RNC 110, that is commanded to forward the cell identification request to suitable base stations that it is in control of. The cell identification request may be sent over Iur from the first RNC 105 and the second RNC 110, and over Iub to the respective base station 125, 135, 140 from the first RNC 105, 405 or the second RNC 110.

According to some embodiments, at least one of the respective base stations 125, 135, 140 is controlled by a second radio network controller 110. In such embodiments, the respective cell identification request may be sent to the at least one of the respective base stations via the second radio network controller 110. The respective cell identification request may then comprise the reported scrambling code. This may help the second RNC 110 to determine in which base station within its control the user equipment 180 should be searched for. Thanks to the cell identification request comprising the reported scrambling code, the second RNC 110 may select which base stations within its control that the request should be forwarded to. For example all base stations that serves a cell that uses the reported scrambling code, or all cells using the reported scrambling code and being located within a certain area etc.

The second RNC 110 may in some embodiments be a home base gateway.

The cell identification request may be sent to the second RNC 110 over the Iur interface 190.

The first RNC 105 may choose which second RNCs, such as the second RNC 110, to forward the cell identification request to using one or more of the following criteria:

Second RNCs controlling at least one cell that is neighbor to the serving cell of the user equipment 110.

Second RNCs controlling at least one cell that is neighbor to one cell controlled by the first RNC 105, 405.

Second RNCs controlling at least one cell within a pre-determined distance from the serving cell of the user equipment 180.

This may be seen as maintaining an RNC neighbor cell relations list and use that information when selecting a set of second RNCs 110 to send the cell identification request to.

According to some embodiments herein, the cell identification request comprises a reference location and possibly a distance within which the second RNC 100 shall consider base stations to forward the cell identification request to. The distance is optional and may be pre-determined per second RNC or sent over Iur.

According to some embodiments, the cell identification request over Iur or Iub includes an expiration timer within which the respective base stations 125, 135, 140 are expected to search for the user equipment 180 within the respective cell 155, 165, 170, and then abort.

The cell identification request over Iur/Iub may be a Radio Link Setup Request message.

In yet another embodiment, the cell identification request over Iur/Iub may be a Radio Link Setup Request message with a simplified radio link configuration for example in the number of radio bearers, depending on whether downlink is configured, etc.

Action 706

This is an optional action according to which the first RNC 105, 405 receives, in response to the cell identification request, a cell identification response. The cell identification response indicates that the identifier of the user equipment 180 has been detected within one responding cell of the at least two cells.

The cell identification responses referred to herein may be a Radio Link Setup Response or a Radio Link Restore Indication, and may include information to uniquely identify the responding cell.

Action 707

This is also an optional action which may be performed when the optional action 706 has been performed. According to this action 707 the first RNC 105, 405 identifies the originating cell as the one responding cell.

Thanks to this, scrambling code confusion can be handled as previously described.

This may enable the first RNC 105 to uniquely identify the responding cell as the originating cell, even if the responding cell is not controlled by the first RNC 105.

Action 708

This is an optional action according to which the first RNC 105, 405 receives more than one cell identification responses in response to the cell identification request.

Action 709

This is also an optional action according to which the first RCN 105, 405 may then determine based on the more than one cell identification responses that there is a scrambling code collision between the more than one responding cells.

Action 710

This is also an optional action according to which the first RCN 105, 405 may then initiate an additional process for preventing further reuse of the reported scrambling code in the more than one responding cells.

Thanks to this scrambling code collisions can be handled as previously described and discussed.

Consider a case with two cells with overlapping coverage that are using the same scrambling code, such as the fifth cell 165 and the sixth cell 170. When the user equipment 180 is located in the overlap area of these to cells and reports one of the cells, a cell identification request is sent to both cells from the serving RNC 105, 405, and both cells will respond positively, i.e. send a cell identification response. This means that the first RNC 105, 405 can detect the scrambling code collision, and also report the collision to a node capable of reassigning one of the scrambling codes in order to resolve the collision. The initiating performed in this action may comprise sending an indication of the scrambling code conflict to the operations and maintenance node 195.

Alternatively, the first RNC 105, 405 may itself reassign the scrambling code to one of the colliding cells.

According to some embodiments, at least one responding cell is controlled by the second radio network controller 110. At least one cell identification response may then be received from the second radio network controller 110. The at least one cell identification response may then further comprise a unique identifier of the responding cell, such as for example a CGI.

According to some embodiments herein the first RNC 105, 405 further sends other information regarding the outcome of handovers to cells which are using the scrambling codes in the defined set. This information may then be sent to the OAM node 195 and may be used for network management purposes and statistics. The information may be separated into nodes using the scrambling codes in the defined set, and other nodes. The outcome of the handovers may also include information about the identification time of the underlay cell, how often a cell identification request fails and no base station responds, etc.

Figure 8:
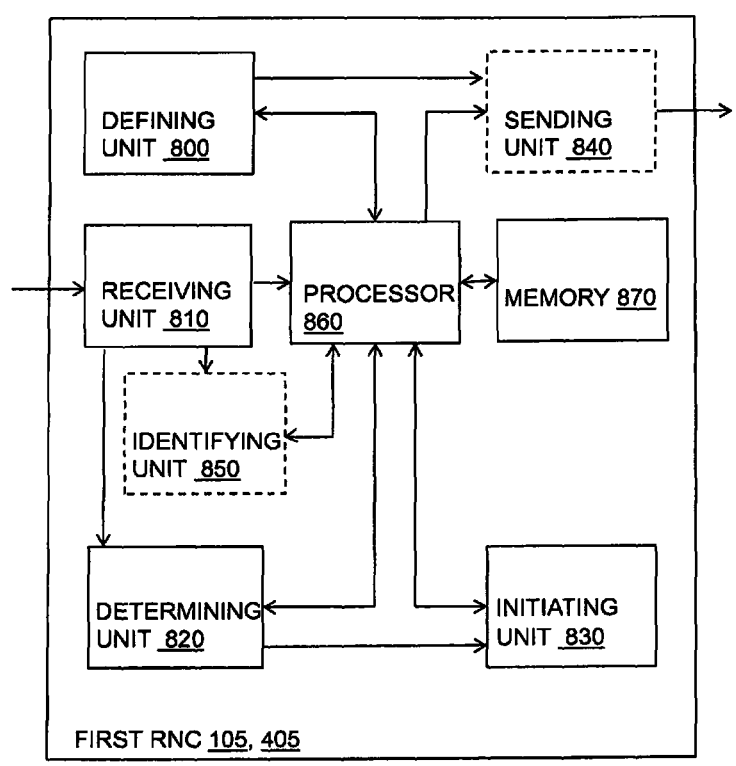
FIG. 8 is a schematic block diagram illustrating embodiments of a first radio network controller.

To perform the actions above for handling a reuse of a scrambling code in the cellular network 100, the first radio network controller 105, 405 comprises an arrangement schematically depicted in FIG. 8.

The first RNC 105, 405 may be of any of the in relation to FIG. 1-6 previously described types, as may the cellular network 100, the user equipment 180, the base stations 115, 120, 125, 130, 135 and 140, as well as the second radio network controller, RNC, 110 that will be referred to below.

The term "configured to" used herein may also be referred to as "arranged to".

The term "unit" may comprise software implementations and/or hardware circuitry.

The first RNC 105, 405 comprises a defining unit 800. The defining unit 800 is configured to define a set of scrambling codes, wherein each scrambling code in the defined set is locally reused in at least two cells in the cellular network 100.

According to some embodiments herein, the scrambling codes in the defined set may be reserved for use in cells which are served by base stations using transmission powers below a threshold.

According to some embodiments herein, the defined set comprises a number of scrambling codes determined as a difference between a total number of neighbour cell scrambling codes that the first RNC 105, 405 is able to configure for the user equipment 180 and an estimated number of neighbour cells that are not underlay cells.

According to some embodiments herein, the defining comprises obtaining the set of scrambling codes from the Operations and Maintenance node 195.

The first RNC 105, 405 further comprises a receiving unit 810. The receiving unit 810 is configured to receive a measurement report from the user equipment 180, which measurement report is related to a scrambling code that is comprised in the defined set of scrambling codes.

The first RNC 105, 405 comprises a determining unit 820. The determining unit 820 is configured to determine that the reported scrambling code is comprised in the defined set of scrambling codes.

The first RNC 105, 405 further comprises an initiating unit 830. The initiating unit 830 is configured to initiate, based on the determination, a process for identifying, among the at least two cells in which the reported scrambling code is locally reused, an originating cell from which the reported scrambling code originates.

According to some embodiments herein, the initiating unit 830 is further configured to perform the initiating by sending a respective cell identification request to each respective base station that serves a respective cell of the at least two cells in which the reported scrambling code is locally reused, which cell identification request comprises an identifier of the user equipment 180, and which cell identification request commands the respective base station to detect the identifier of the user equipment 180 within the respective cell.

According to some embodiments herein, the first RNC 105, 405 further comprises a sending unit 840. The sending unit 840 is configured to send a message to the user equipment 180. The message commands the user equipment 180 to use a neighbour cell relation list comprising the defined set of scrambling codes.

According to some embodiments herein, the receiving unit 810 is further configured to receive, in response to the cell identification request, a cell identification response, which cell identification response indicates that the identifier of the user equipment 180 has been detected within one responding cell of the at least two cells.

The first RNC 105, 405 may then further comprise an identifying unit 850 configured to identify the originating cell as the one responding cell.

According to some embodiments herein, the receiving unit 810 is further configured to receive in response to the cell identification request more than one cell identification responses, the determining unit 820 is further configured to determine based on the more than one cell identification responses that there is a scrambling code collision between the more than one responding cells, and the initiating unit 830 is further configured to initiate an additional process for preventing further reuse of the reported scrambling code in the more than one responding cells.

According to some embodiments herein, at least one of the respective base stations is controlled by the second RNC110, the respective cell identification request is sent to the at least one of the respective base stations via the RNC 110, and the respective cell identification request comprises the reported scrambling code.

According to some embodiments herein, at least one responding cell is controlled by the second RNC 110, and the receiving unit 810 is further configured to receive at least one cell identification response from the second RNC 110 and the at least one cell identification response further comprises a unique identifier of the responding cell.

According to some embodiments herein, the sending unit 840 is further configured to send an indication of the scrambling code conflict to the operations and maintenance node 195.

The embodiments of the first RNC 105, 405 for handling a reuse of a scrambling code in the cellular network 100 may be implemented through one or more processors, such as a processor 860 in the first RNC 105, 405 depicted in FIG. 8, together with computer program code for performing the actions of embodiments herein.

The program code mentioned above may also be provided as a computer program product, for instance in the form of a data carrier carrying computer program code for performing the embodiments herein when being loaded into the first RNC 105, 405.

One such carrier may be in the form of a CD ROM disc. It is however feasible with other data carriers such as a memory stick. The computer program code may furthermore be provided as pure program code on a server and downloaded to the first RNC 105, 405 e.g. remotely.

The first RNC 105, 405 may further comprise a memory 870 comprising one or more memory units. The memory 870 is arranged to be used to store data such as for example the defined set of scrambling codes, the reported scrambling codes and/or the unique cell identities. It may further be arranged to store applications to perform the actions of the embodiments herein when being executed in the first RNC 105, 405.

Figure 9:
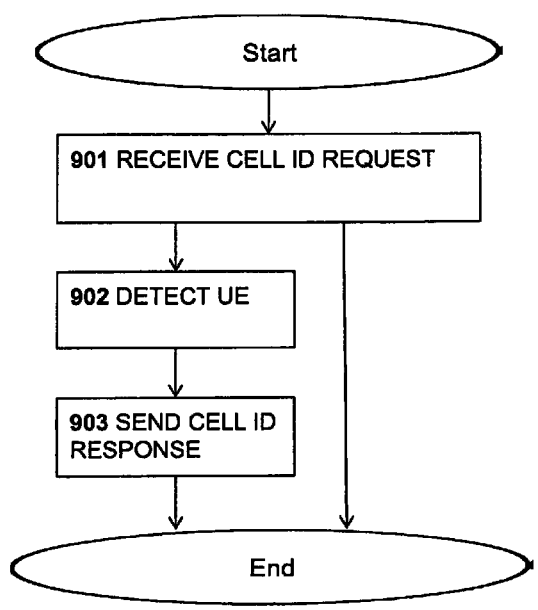
FIG. 9 is a flowchart depicting embodiments of a method in a base station.

Embodiments herein relating to a method in the base station 125, 135, 140 for assisting the first radio network controller 105, 405 in handling a reuse of a scrambling code in a cellular network 100, will now be further elaborated and described with reference to the flowchart depicted in FIG. 9. These embodiments will also be described in a more general way.

The base station 125, 135 140 may be of any of the in relation to FIG. 1-6 previously described types, as may the cellular network 100, the first RNC 105, 405, the user equipment 180 and the second RNC 110 that will be referred to below. As previously described, the base station 125, 135, 140 serves a respective cell of at least two cells in which a scrambling code is locally reused, The method comprises the following actions which may be taken in any suitable order.

Action 901

The base station 125, 135, 140 receives a cell identification request from the first RNC 105, 405. The cell identification request comprises an identifier of the user equipment 180 that has reported the scrambling code. The cell identification request commands the respective base station 125, 135, 140 to detect the identifier of the user equipment 180 within the respective cell.

According to some embodiments herein, the cell identification request is received via the second RNC 110.

The following actions 902 and 903 described below are optional actions.

Action 902

The base station 125, 135, 140 detects the identifier of the user equipment 180 within the respective cell.

Action 903

The base station 125, 135, 140 may then send a cell identification response which cell identification response indicates that the identifier of the user equipment 180 has been detected within a responding cell being the respective cell.

According to some embodiments herein, the cell identification response is sent via the second RNC 110.

Figure 10:
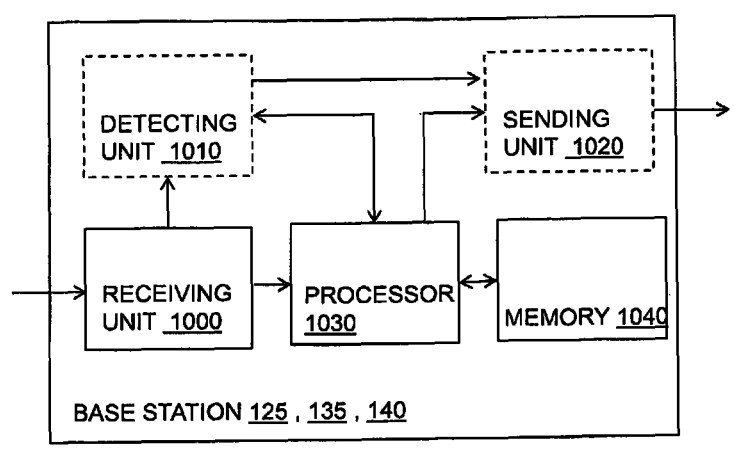
FIG. 10 is a schematic block diagram illustrating embodiments of a base station.

To perform the actions above for assisting the first radio network controller 105, 405 in handling a reuse of a scrambling code in a cellular network 100, the base station 125, 135, 140 comprises an arrangement schematically depicted in FIG. 10.

As previously mentioned, the base station 125, 135, 140 is configured to serve a respective cell of at least two cells in which a scrambling code is locally reused.

The base station 125, 135 140 may be of any of the in relation to FIG. 1-6 previously described types, as may the cellular network 100, the first RNC 105, 405, the user equipment 180 and the second RNC 110 that will be referred to below.

The term "configured to" used herein may also be referred to as "arranged to".

The term "unit" may comprise software implementations and/or hardware circuitry.

The base station 125, 135, 140 comprises a receiving unit 1000. The receiving unit 1000 is configured to receive a cell identification request from the first RNC 105, 405, which cell identification request comprises an identifier of the user equipment 180 that has reported the scrambling code. The cell identification request commands the respective base station 125, 135, 140 to detect the identifier of the user equipment 180 within the respective cell.

According to some embodiments herein, the receiving unit 1000 is further configured to receive the cell identification request via the second RNC 110.

According to some embodiments herein, the base station 125, 135, 140 further comprises a detecting unit 1010. The detecting unit 1010 is configured to detect the identifier of the user equipment 180 within the respective cell.

According to some embodiments herein, the base station 125, 135, 140 further comprises a sending unit 1020. The sending unit 1020 is configured to send a cell identification response which cell identification response indicates that the identifier of the user equipment 180 has been detected within a responding cell being the respective cell.

According to some embodiments herein, the sending unit is further configured to send the cell identification response via the second RNC 110.

The embodiments of the base station 125, 135, 140 for assisting the first radio network controller 105, 405 in handling a reuse of a scrambling code in a cellular network 100 may be implemented through one or more processors, such as a processor 1030 in the base station 125, 135, 140 depicted in FIG. 10, together with computer program code for performing the actions of embodiments herein.

The program code mentioned above may also be provided as a computer program product, for instance in the form of a data carrier carrying computer program code for performing the embodiments herein when being loaded into the base station 125, 135, 140.

One such carrier may be in the form of a CD ROM disc. It is however feasible with other data carriers such as a memory stick. The computer program code may furthermore be provided as pure program code on a server and downloaded to the base station 125, 135, 140 e.g. remotely.

The base station 125, 135, 140 may further comprise a memory 1040 comprising one or more memory units. The memory 1040 is arranged to be used to store data such as for example the defined set of scrambling codes, the reported scrambling codes and/or the unique cell identities. It may further be arranged to store applications to perform the actions of the embodiments herein when being executed in the base station 125, 135, 140.

Figure 11:
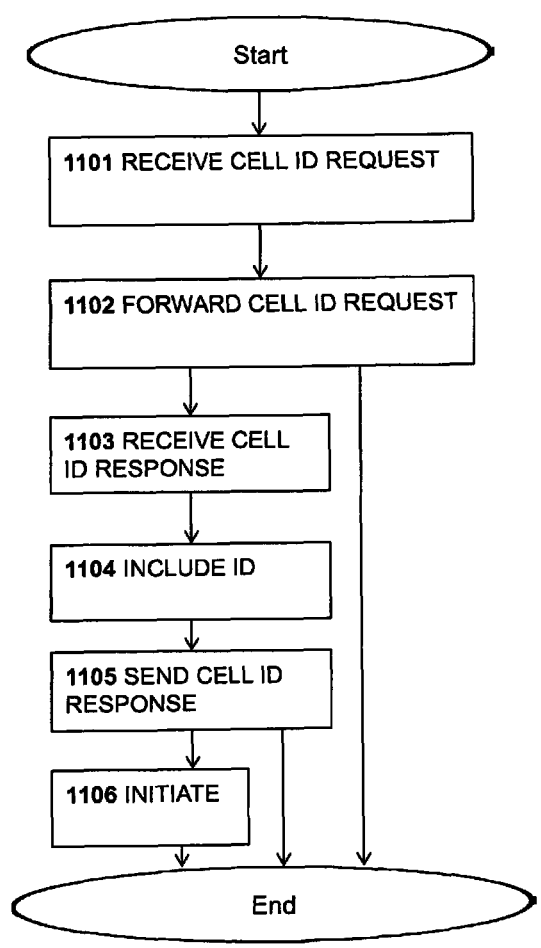
FIG. 11 is a flowchart depicting embodiments of a method in a second radio network controller.

Embodiments herein relating to a method in the second radio network controller, RNC, 110 for assisting the first radio network controller 105, 405 in handling a reuse of a scrambling code in a cellular network 100, will now be further elaborated and described with reference to the flowchart depicted in FIG. 11. These embodiments will be described in a more general way.

The second RNC 110 may be of any of the in relation to FIG. 1-6 previously described types, as may the cellular network 100, the user equipment 180, the base stations 125, 135 and 140, as well as the first RNC 405 that will be referred to below.

According to some embodiments herein, the second RNC 110 is a home base station gateway controlling at least one home base station.

As previously described, the second RNC 110 controls a respective base station that serves a respective cell of at least two cells in which a scrambling code is locally reused.

The method comprises the following actions which may be taken in any suitable order.

Action 1101

The second RNC 110 receives a cell identification request from the first radio network controller 405. The cell identification request comprises an identifier of a user equipment 180 that has reported the scrambling code. The cell identification request commands the respective base station to detect the identifier of the user equipment 180 within the respective cell.

Action 1102

The second RNC 110 forwards the cell identification request to the respective base station.

The respective cell identification request received in action 1101 may comprise the reported scrambling code. This may help the second RNC 110 to determine in which base station within its control the user equipment 180 should be searched for. This second RNC 110 may then select which base stations within its control that the cell identification request should be forwarded to, such as for example to all base stations that serves a cell that uses the reported scrambling code, or to all base stations using the reported scrambling code and being located within a certain area etc.

Actions 1103-1105 described below are optional.

Action 1103

The second RNC 110 may receive from the respective base station, a cell identification response which cell identification response indicates that the identifier of the user equipment has been detected in a responding cell being the respective cell.

Action 1104

The second RNC 110 may then include a unique identifier of the responding cell in the cell identification response.

Action 1105

The second RNC 110 may then send the cell identification response to the first radio network controller.

The unique identifier may be a Cell Global Identifier (CGI) of the responding cell.

According to some embodiments the second RNC 110 receives, in action 1103 described above, more than one cell identification responses. The second RNC 110 may then perform the optional action 1106, wherein it initiates an additional process for preventing further reuse of the reported scrambling code in the more than one responding cells. Hence, it may be the second RNC that initiates this additional process.

Figure 12:
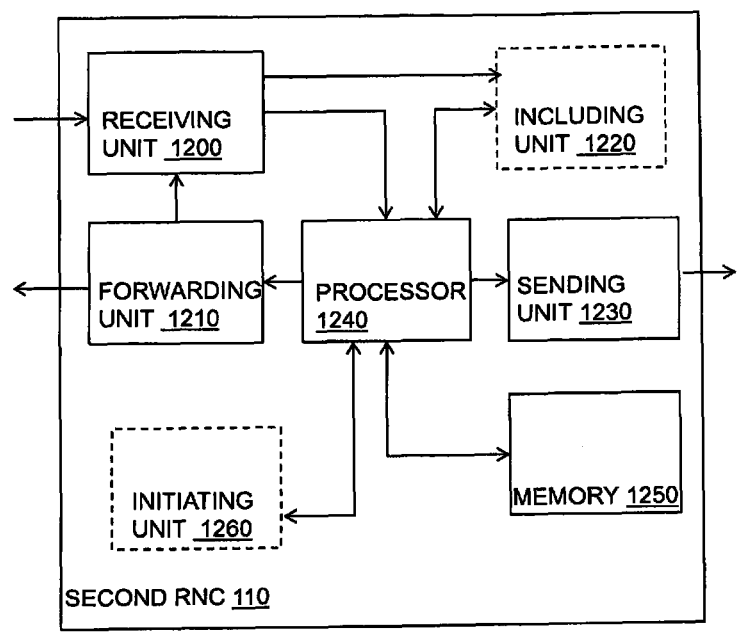
FIG. 12 is a schematic block diagram illustrating embodiments of a second radio network controller.

To perform the actions above for assisting the first radio network controller 105, 405 in handling a reuse of a scrambling code in a cellular network 100, the second RNC 110 comprises an arrangement schematically depicted in FIG. 12.

As previously mentioned, second RNC 110 is configured to control a respective base station 125, 135, 140 that serves a respective cell of at least two cells in which a scrambling code is locally reused.

The second RNC 110 may be of any of the in relation to FIG. 1-6 previously described types, as may cellular network 100, the user equipment 180, the base stations 125, 135 140, as well as the first RNC 405 that will be referred to below. The second RNC 110 may be a home base station gateway controlling at least one home base station.

The second RNC 110 comprises a receiving unit 1200. The receiving unit 1200 is configured to receive a cell identification request from the first RNC 405, which cell identification request comprises an identifier of the user equipment 180 that has reported the scrambling code. The cell identification request commands the respective base station 125, 135, 140 to detect the identifier of the user equipment 180 within the respective cell.

According to some embodiments herein, the receiving unit 1200 is further configured to receive from the respective base station 125, 135, 140 a cell identification response, which cell identification response indicates that the identifier of the user equipment 180 has been detected in a responding cell being the respective cell.

The second RNC 110 comprises a forwarding unit 1210. The forwarding unit 1210 is configured to forward the cell identification request to the respective base station 125, 135, 140.

According to some embodiments herein, the second RNC 110 further comprises an including unit 1220. The including unit 1220 is configured to include a unique identifier of the responding cell in the cell identification response, and a sending unit 1230 configured to send the cell identification response to the first RNC 405.

The unique identifier may be a CGI of the responding cell.

The embodiments of the second RNC 110 for assisting the first radio network controller 105, 405 in handling a reuse of a scrambling code in a cellular network 100 may be implemented through one or more processors, such as a processor 1240 in the second RNC 110 depicted in FIG. 12, together with computer program code for performing the actions of embodiments herein.

The program code mentioned above may also be provided as a computer program product, for instance in the form of a data carrier carrying computer program code for performing the embodiments herein when being loaded into the second RNC 110.

One such carrier may be in the form of a CD ROM disc. It is however feasible with other data carriers such as a memory stick. The computer program code may furthermore be provided as pure program code on a server and downloaded to the second RNC 110 e.g. remotely.

The second RNC 110 may further comprise a memory 1250 comprising one or more memory units. The memory 1040 is arranged to be used to store data such as for example the defined set of scrambling codes, the reported scrambling codes and/or the unique cell identities. It may further be arranged to store applications to perform the actions of the embodiments herein when being executed in the second RNC 110.

The second RNC 110 may in some embodiments further comprise an initiating unit 1260 configured to initiate an additional process for preventing further reuse of the reported scrambling code in the more than one responding cells. This may be done when more than one cell identification responses has been received.

Figure 13:
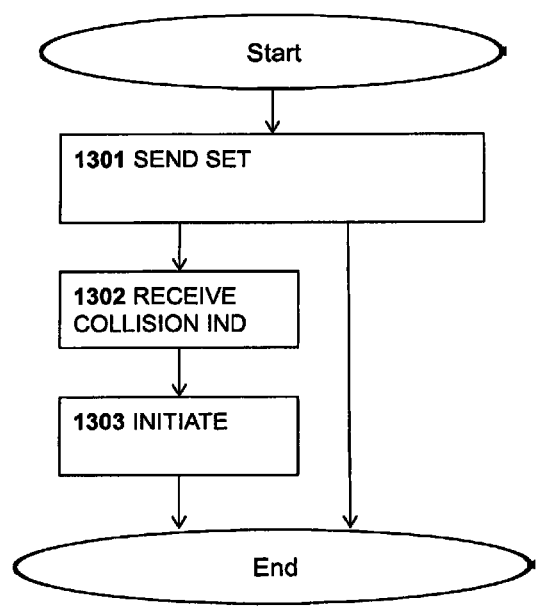
FIG. 13 is a flowchart depicting embodiments of a method in an operations and maintenance node.

Embodiments herein relating to a method in the OPN node 195 for assisting the first RNC 105, 405 in handling a reuse of a scrambling code in a cellular network 100 will now be further elaborated and described with reference to the flowchart depicted in FIG. 13. These embodiments will be described in a more general way.

The OPN node 195 and the first RNC 105, 405 may be of any of the in relation to FIG. 1-6 previously described types, as may cellular network 100, the user equipment 180, the base stations 115, 120, 125, 130, 135 and 140, as well as the second radio network controller, RNC, 110 that will be referred to below.

The method comprises the following actions which may be taken in any suitable order.

Action 1301

The OAM node 195 sends a set of scrambling codes to the first RNC 105, 405. Each scrambling code in the defined set is locally reused by at least two cells in the cellular network 100.

Action 1302

This is an optional action according to which the OAM node 195 further receives an indication of a scrambling code collision related to a scrambling code in the set of scrambling codes. The indication may be received from the first RNC 105, 405, and/or from the second RNC 110.

Action 1303

This is also an optional action that may be performed when the above described action 1302 has been carried out. In this optional action 1303, the OAM node 195 further initiates a process for solving the scrambling code collision.

It may be the OAM node that is handling the reassignment of scrambling codes.

According to some embodiments the OAM node 195 further receives other information regarding the outcome of handovers to cells which are using the scrambling codes in the defined set. This information may then be received from the first RNC 105, 405, and may be used for network management purposes and statistics. The information may be separated into nodes using the scrambling codes in the defined set, and other nodes. The outcome of the handovers may also include information about the identification time of the underlay cell, how often a cell identification request fails and no base station responds, etc.

Figure 14:
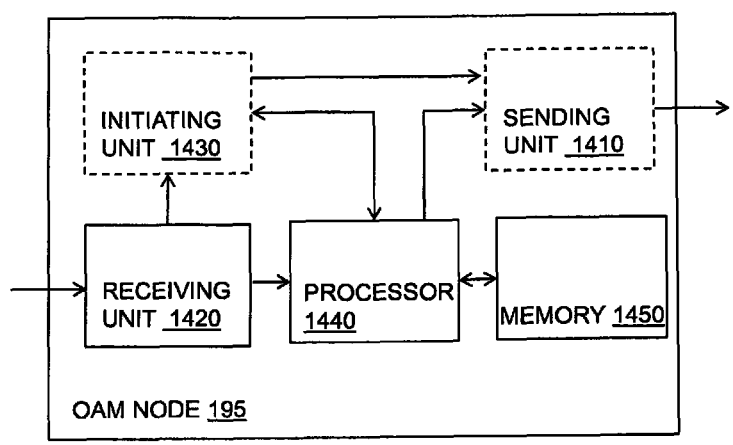
FIG. 14 is a schematic block diagram illustrating embodiments of an operations and maintenance node.

To perform the actions above for assisting the first RNC 105, 405 in handling a reuse of a scrambling code in the cellular network 100, the OAM node 195 comprises an arrangement schematically depicted in FIG. 14.

The first OAM node 195 and the RNC 105, 405 may be of any of the in relation to FIG. 1-6 previously described types, as may the cellular network 100, the user equipment 180, the base stations 115, 120, 125, 130, 135 and 140, as well as the second radio network controller, RNC,110 that will be referred to below.

The term "configured to" used herein may also be referred to as "arranged to".

The term "unit" may comprise software implementations and/or hardware circuitry.

The OAM node 195 comprises a sending unit 1410 configured to send a set of scrambling codes to the first radio network controller 105, 405, wherein each scrambling code in the defined set is locally reused by at least two cells in the cellular network 100.

According to some embodiments, the DAM node 195 further comprises a receiving unit 1420 configured to receive an indication of a scrambling code collision related to a scrambling code in the set of scrambling code and an initiating unit 1430 configured to initiate a process for solving the scrambling code collision.

The embodiments of the OAM node 195 for assisting the first radio network controller 105, 405 in handling a reuse of a scrambling code in a cellular network 100 may be implemented through one or more processors, such as a processor 1440 in the OAM node 195 depicted in FIG. 14, together with computer program code for performing the actions of embodiments herein.

The program code mentioned above may also be provided as a computer program product, for instance in the form of a data carrier carrying computer program code for performing the embodiments herein when being loaded into the OAM node 195.

One such carrier may be in the form of a CD ROM disc. It is however feasible with other data carriers such as a memory stick. The computer program code may furthermore be provided as pure program code on a server and downloaded to the OAM node 195 e.g. remotely.

The OAM node 195 may further comprise a memory 1450 comprising one or more memory units. The memory 1450 is arranged to be used to store data such as for example the defined set of scrambling codes, the reported scrambling codes and/or the unique cell identities. It may further be arranged to store applications to perform the actions of the embodiments herein when being executed in the OAM node 195.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a radio network controller for handling a reuse of a scrambling code in a cellular network, the method comprising:
   defining a set of scrambling codes, wherein each scrambling code in the defined set of scrambling codes is locally reused in at least two cells in the cellular network,
   receiving a measurement report from a user equipment, which measurement report is related to a scrambling code that is comprised in the defined set of scrambling codes,
   determining that the reported scrambling code is comprised in the defined set of scrambling codes, and
   initiating, upon determining that the reported scrambling code is comprised in the defined set of scrambling codes, a process for identifying, among the at least two cells in which the reported scrambling code is locally reused, an originating cell from which the reported scrambling code originates,
   wherein the initiating is performed by sending a respective cell identification request to each respective base station that serves a respective cell of the at least two cells in which the reported scrambling code is locally reused, which cell identification request comprises an identifier of the user equipment, and which cell identification request commands the respective base station to detect the identifier of the user equipment within the respective cell.

2. The method of claim 1, further comprising sending a message to the user equipment, which message commands the user equipment to use a neighboring cell relation list comprising the defined set of scrambling codes.

3. The method of claim 1, further comprising receiving, in response to the cell identification request, a cell identification response, the cell identification response indicates that the identifier of the user equipment has been detected within one responding cell of the at least two cells, and identifying the originating cell as the one responding cell.

4. The method of claim 1, further comprising:
   receiving in response to the cell identification request more than one cell identification responses,
   determining based on the more than one cell identification responses that there is a scrambling code collision between more than one responding cells, and
   initiating an additional process for preventing further reuse of the reported scrambling code in the more than one responding cells.

5. The method of claim 1, wherein at least one of the respective base stations is controlled by a second radio network controller, and wherein the respective cell identification request is sent to the at least one of the respective base stations via the second radio network controller, and wherein the respective cell identification request comprises the reported scrambling code.

6. The method of claim 5, wherein at least one responding cell is controlled by the second radio network controller, wherein at least one cell identification response is received from the second radio network controller and wherein the at least one cell identification response further comprises a unique identifier of the at least one responding cell.

7. The method of claim 1, wherein the scrambling codes in the defined set of scrambling codes are reserved for use in cells which are served by base stations using transmission powers below a threshold.

8. The method of claim 1, wherein the defined set of scrambling codes comprises a number of scrambling codes determined as a difference between a total number of neighboring cell scrambling codes that the radio network controller is able to configure for the user equipment and an estimated number of neighboring cells that are not underlay cells.

9. The method of claim 1, wherein the defining comprises obtaining the set of scrambling codes from an Operations and Maintenance node.

10. A radio network controller for handling a reuse of a scrambling code in a cellular network, the radio network controller comprising:
    a processor that defines a set of scrambling codes, wherein each scrambling code in the defined set of scrambling codes is locally reused in at least two cells in the cellular network, and
    a receiver that receives a measurement report from a user equipment, which measurement report is related to a scrambling code that is comprised in the defined set of scrambling codes,
    wherein the processor determines that the reported scrambling code is comprised in the defined set of scrambling codes, and
    the processor initiates, based on the determination that the reported scrambling code is comprised in the defined set of scrambling codes, a process for identifying, among the at least two cells in which the reported scrambling code is locally reused, an originating cell from which the reported scrambling code originates,
    wherein the processor performs the initiating by sending a respective cell identification request to each respective base station that serves a respective cell of the at least two cells in which the reported scrambling code is locally reused, which cell identification request comprises an identifier of the user equipment, and which cell identification request commands the respective base station to detect the identifier of the user equipment within the respective cell.

11. The radio network controller of claim 10, further comprising a transmitter that sends a message to the user equipment, which message commands the user equipment to use a neighboring cell relation list comprising the defined set of scrambling codes.

12. The radio network controller of claim 10, wherein the receiver receives, in response to the cell identification request, a cell identification response, which cell identification response indicates that the identifier of the user equipment has been detected within one responding cell of the at least two cells, and wherein the processor identifies the originating cell as the one responding cell.

13. The radio network controller of claim 10, wherein the receiver receives in response to the cell identification request more than one cell identification responses, wherein the processor determines based on the more than one cell identification responses that there is a scrambling code collision between more than one responding cells, and initiates an additional process for preventing further reuse of the reported scrambling code in the more than one responding cells.

14. The radio network controller of claim 10, wherein at least one of the respective base stations is controlled by a second radio network controller, and wherein the respective cell identification request is sent to the at least one of the respective base stations via the second radio network controller, and wherein the respective cell identification request comprises the reported scrambling code.

15. The radio network controller of claim 14, wherein at least one responding cell is controlled by the second radio network controller, wherein the receiver receives at least one cell identification response from the second radio network controller and wherein the at least one cell identification response further comprises a unique identifier of the responding cell.

16. The radio network controller of claim 10, wherein the scrambling codes in the defined set of scrambling codes are reserved for use in cells which are served by base stations using transmission powers below a threshold.

17. The radio network controller of claim 10, wherein the defined set of scrambling codes comprises a number of scrambling codes determined as a difference between a total number of neighboring cell scrambling codes that the radio network controller is able to configure for the user equipment and an estimated number of neighboring cells that are not underlay cells.

18. The radio network controller of claim 10, wherein the defining comprises obtaining the set of scrambling codes from an Operations and Maintenance node.

* * * * *